United States Patent
Strese et al.

(10) Patent No.: US 10,481,693 B2
(45) Date of Patent: Nov. 19, 2019

(54) INPUT/OUTPUT DEVICE AND METHOD FOR THE COMPUTER-BASED DISPLAY AND EXPLORATION OF REAL OR VIRTUAL OBJECT SURFACES

(71) Applicant: Technische Universität München, Munich (DE)

(72) Inventors: Matti Strese, Munich (DE); Kevin Kuonath, Munich (DE); Andreas Noll, Munich (DE); Eckehard Steinbach, Olching (DE); Martin Piccolrovazzi, Munich (DE)

(73) Assignee: Technische Universität München, Munich (DE)

( * ) Notice: Subject to any disclaimer, the term of this patent is extended or adjusted under 35 U.S.C. 154(b) by 62 days.

(21) Appl. No.: 15/894,012

(22) Filed: Feb. 12, 2018

(65) Prior Publication Data

US 2018/0267609 A1 Sep. 20, 2018

(30) Foreign Application Priority Data

Mar. 15, 2017 (DE) .................. 10 2017 204 351

(51) Int. Cl.
*G06F 3/01* (2006.01)
*G06F 3/0354* (2013.01)

(52) U.S. Cl.
CPC .......... *G06F 3/016* (2013.01); *G06F 3/03543* (2013.01)

(58) Field of Classification Search
CPC ................ G06F 3/016; G06F 3/03543
See application file for complete search history.

(56) References Cited

U.S. PATENT DOCUMENTS

| | | | | |
|---|---|---|---|---|
| 2008/0251364 | A1* | 10/2008 | Takala | G06F 3/01 200/341 |
| 2010/0231550 | A1* | 9/2010 | Cruz-Hernandez | G06F 3/016 345/174 |
| 2012/0232780 | A1* | 9/2012 | Delson | A63F 13/06 701/400 |
| 2016/0175711 | A1* | 6/2016 | Billington | G06F 3/016 463/38 |

(Continued)

OTHER PUBLICATIONS

A. Abdulali and S. Jeon, "Data-Driven Modeling of Anisotropic Haptic Textures: Data Segmentation and Interpolation" in International Conference on Human Haptic Sensing and Touch Enabled Computer Applications, pp. 228-239, 2016.

(Continued)

*Primary Examiner* — Muhammad N Edun
(74) *Attorney, Agent, or Firm* — Smartpat PLC

(57) ABSTRACT

The disclosure relates to a manually operable tactile input/output device for a data processing system, in particular a tactile computer mouse, which is configured with a housing and a plurality of actuators in operative connection with the housing and in which the actuators are arranged and jointly controlled in the housing to cause at least temporarily a tactile perception by a user in manual contact with the housing, by which simultaneously at least two and in particular all five tactile perception dimensions of microscopic roughness, macroscopic roughness, friction, hardness and heat are simulated. Furthermore, the disclosure relates to an operating method for a manually operable tactile input/output device and a data processing system.

19 Claims, 16 Drawing Sheets

(56) References Cited

U.S. PATENT DOCUMENTS

2017/0087458 A1* 3/2017 Nakagawa .............. A63F 13/54

OTHER PUBLICATIONS

A. Terry and H. Hsiao, "Tactile Feedback in a Computer Mouse" in IEEE Proceedings of the 1988 Fourteenth Annual Northeast Bioengineering Conference, pp. 146-149, 1988.

H. Culbertson and K. Kuchenbecker, "Importance of Matching Physical Friction, Hardness, and Texture in Creating Realistic Haptic Virtual Surfaces" in IEEE Transactions on Haptics, Jan. 2017.

H. Culbertson and K. Kuchenbecker, "Ungrounded Haptic Augmented Reality System for Displaying Roughness and Friction" in IEEE/ASME Transactions on Mechatronics, 2017.

H. Culbertson, J. Unwin and K. Kuchenbecker, "Modeling and Rendering Realistic Textures from Unconstrained Tool-Surface Interactions" in Transactions on Haptics, vol. 7, No. 3, pp. 381-393, Jul. 2014.

K. Kuchenbecker, J. Romano and W. McMahan, "Haptography : Capturing and Recreating the Rich Feel of Real Surfaces" in The 14th International Symposium on Robotics Research (ISRR), 2009.

L. Brayda, C. Campus, M. Memeo and L. Lucagrossi, "The Importance of Visual Experience, Gender, and Emotion in the Assessment of an Assistive Tactile Mouse" in IEEE Transactions on Haptics, pp. 279-286, 2015.

M. Price and C. Frank, "A Robotic Touchscreen Totem for Twodimensional Haptic Force Display" in IEEE Haptics Symposium, Apr. 2016.

M. Strese, C. Schuwerk and E. Steinbach, "Surface classification using acceleration signals recorded during human freehand movement," 2015 IEEE World Haptics Conference (WHC), Evanston, IL, 2015, pp. 214-219.

Matti Strese, Jun-Yong Lee, Clemens Schuwerk, Qingfu Han, Hyoung-Gook Kim, and Eckehard Steinbach, "A Haptic Texture Database for Tool-mediatedTexture Recognition and Classification", 2014 IEEE International Symposium on Haptic, Audio and Visual Environments and Games (HAVE) Proceedings, Richardson, TX, 2014, pp. 118-123.

S. Okamoto, H. Nagano and Y. Yamada, "Psychophysical Dimensions of Tactile Perception of Textures" in IEEE Transactions on Haptics, vol. 6, No. 1, pp. 81-93, Mar. 2013.

T. Pietrzak, I. Pecci and B. Martin, "Static and Dynamic Tactile Directional Cues Experiments with VTPlayer Mouse" in Eurohaptics, pp. 63-68, 2006.

* cited by examiner

INPUT/OUTPUT DEVICE AND METHOD FOR THE COMPUTER-BASED DISPLAY AND EXPLORATION OF REAL OR VIRTUAL OBJECT SURFACES

TECHNICAL FIELD

The present disclosure relates to a manually operable tactile input/output device for a data processing system, an operating method for a manually operable input/output device and to a data processing system as such. In particular, the present disclosure relates to a tactile computer mouse.

BACKGROUND

Data processing systems in the broadest sense are often provided with manually operable input/output devices, such as computer mice, to allow manual input by a user in addition to keyboard and voice inputs. With such manually operable input/output devices a user can perform operations such as pointing, dragging, and dropping, for example, to manipulate objects on a screen.

In modern applications, tactile feedback to the user via the respective input/output device is increasingly used, for example, to confirm a mouse click by imposing an inertial force or to attract the user's attention through force feedback.

The structure of such tactile feedback cannot be modulated and is therefore not suitable to generate more complex feedback to the user.

It is an object of the present disclosure to provide a manually operable tactile input/output device, a corresponding operating method, and a data processing system in which highly flexible tactile feedback can be provided to a user and which in particular can provide a tactile simulation of surface structures.

SUMMARY

The solution of this object is achieved by a manually operable tactile input/output device, an operating method for a manually operable tactile input/output device, and in a data processing system as disclosed in the independent claims. Advantageous embodiments are respectively the subject matter of the dependent claims.

According to a first aspect, the present disclosure relates to a manually operable tactile input/output device for a data processing system and in particular a tactile computer mouse.

The input/output device is configured with a housing and with a plurality of actuators in operative connection with the housing. The actuators are arranged in their housing and jointly controlled to effect, at least temporarily, a tactile feedback to a user in manual contact with the housing. The tactile feedback provides the user a sense of at least two and possibly all five dimensions of tactile perception. Those dimensions are: microscopic roughness, macroscopic roughness, friction, hardness and thermal conductivity. The actuators enable a comprehensive and complex tactile feedback to a user of the manually operable tactile input/output device. It is particularly possible to provide the user feedback in form of a tactile surface sensation, similar to what the user experiences when sweeping over a material surface by hand. The tactile feedback via the tactile input/output device provides the user a sensation of touching a virtual/simulated surface.

The terms "tactile perception dimension", "tactile perception" and variations thereof are intended to describe any of the aspects or dimensions of microscopic roughness, macroscopic roughness, friction, hardness, and thermal conductivity that are necessary to broadly describe the tactile perceptibility of material surfaces according to Okamoto et al. This is described in detail, for example, in the publication "Psychophysical dimensions of tactile perception of textures" by Okamoto, Nagano and Yamada, IEEE Transactions on Haptics, Volume 6, pages 81 to 93, of March 2013.

There are various possibilities to realize a tactile perceptible feedback, which is also referred to below in short as tactile feedback. The term "haptic", as the general term for sensory perceptions of all contact-based human interactions with the environment, includes the two subdimensions "kinesthetic" and "tactile". Kinesthetic haptic generally encompasses the perception of, for example, object shape, weight and the like. Tactile haptic generally encompasses the perception of surface properties on these objects, such as microscopic and macroscopic roughness, friction, hardness, and thermal conductivity sensation.

An advantageous embodiment of the input/output device thus provides that a respective actuator is arranged and has means to effect as a tactile perceptible feedback a position, orientation, movement, in particular a vibration, a mobility and/or a superimposition of a body of the input/output device, the housing or a part thereof and in particular a first part of the housing relative to a second part of the housing, wherein in particular their temporal changes can also be realized. These measures can represent the aspects of macroscopic and microscopic roughness as well as the friction of a material surface.

Alternatively or additionally, it is conceivable that a respective actuator is arranged and has means to effect as a tactile perceptible feedback a mobility and in particular displaceability of the input/output device and in particular a body or the housing thereof relative to a pad and in particular their temporal change. By these measures, it is possible to generate and represent associated surface properties with friction, which manifest themselves, for example, by a more or less strong reluctance to displace or turn a body on a material base.

According to a further alternative or additional embodiment of the manually operable tactile input/output device, it is provided that a respective actuator is arranged to effect as a tactile perceptible feedback a thermal conductivity and/or thermal conductivity distribution of a body of the input/output device, of the housing or a part thereof and in particular a first part of the housing or a part thereof and in particular their temporal change. The sensations of more or less thermally conductive surfaces can be generated and represented through these measures.

In order to convert the individual tactile perception dimensions into properties and behaviors of the manually operable tactile input/output device, different mechanical, thermal and/or electromagnetic interaction mechanisms are provided, which can be realized in particular in the region of the housing of the input/output device.

The present disclosure refers to actuators by names such as "first actuator", "second actuator" and so forth. It should be noted that the numbering of actuators is provided to distinguish the different actuators, but does not mandate a presence of lower numbered actuators. That is, the disclosed device may e.g. include a second actuator without having a first actuator.

It is thus conceivable, that a first actuator is configured for the tactile simulation of microscopic roughness of a surface.

The first actuator is arranged to controllably form a tactile perceptible vibration of a body of the input/output device, of the housing or a part thereof and in particular a first part of the housing relative to a second part of the housing and/or their temporal change. The vibration may be at a sine wave (single frequency) vibration or be a superposition of multiple frequencies.

In a preferred embodiment of the input/output device, the first actuator may be a voice coil arrangement with at least one voice coil and preferably with a vibration mass which can be excited to cause mechanical vibrations by application of an electrical voltage. During operation, the inertial forces associated with the vibration, in particular the vibration mass, are transmitted to the housing of the input/output device, this being noticeable through vibration by the user.

In connection with the present disclosure, the terms voice coil arrangement, voice coil actuator and VCA are used synonymously as long as no further details are given.

A particular advantage in this embodiment is that any vibration patterns can be transferred to the voice coil to simulate and reproduce more complex surface structures and/or their areal variation, for example, in the course of movement over a virtual surface. Such a procedure is not possible with conventional computer mice with vibration feedback or force feedback.

For tactile simulation of macroscopic roughness of a surface, the input/output device may have a second actuator, which is arranged to controllably form a tactile perceptible tilting movement and/or superimposition of tilting movements of a first part of the housing relative to a second part of the housing around one or more and in particular around mutually perpendicular tilt axes and/or their temporal change. In particular, provided tilting angles can be understood and realized as a roll angle around a longitudinal axis, as a pitch angle around a transverse axis and/or as a yaw angle around a vertical axis of the respective input/output device and in particular the computer mouse. Through these measures, macroscopic roughness of a material surface, for example, in the sense of a contour or one with a mesoscopic or macroscopic shape curve, can be felt in a particularly flexible and reliable manner using particularly simple means.

For forming a respective tilting movement around a respective tilt axis, the second actuator has, for example, respectively a servomotor which controllably tiltably mechanically couples to each other the first part of the housing and the second part of the housing of the input/output device against each other to the respective tilt axis.

For the tactile simulation of hardness of a surface, it is conceivable to configure a third actuator which is arranged to controllably form as a tactile perceptible mobility and in particular tiltability and/or superimposition of mobilities and in particular tiltabilities of a first part of the housing relative to a second part of the housing around one or more and in particular to mutually perpendicular tilt axes and/or their temporal change. Through these measures, it is achieved that the sensation of the more or less strong penetration into a material on the surface by a static pressure as in a real material surface is generated by a corresponding reaction in or on the input/output device.

The third actuator for forming a respective mobility and/or tiltability around a respective tilt axis can have respective means by which a resistance between the first part of the housing and the second part of the housing against movement and in particular against tilting against each other is controllable. The means may preferably have a servomotor, by which a movement and in particular a tilting are controllably counteracted or countered by manual operation by a user, in particular by blocking.

In another additional or alternative embodiment of the input/output device, a fourth actuator is configured for tactile simulation of friction of a surface. The fourth actuator may in particular be arranged to controllably form a tactile perceptible mobility and in particular a displaceability of a body of the input/output device and in particular of the housing relative to a pad on which the input/output device is placed, and/or their temporal change. In this way, it is possible to generate and represent a resistance of a material surface against displacement, wherein a resistance to twisting in the plane of the surface can be realized.

These measures can be put into effect particularly simply in which the fourth actuator for forming a respective mobility and/or displaceability has a means by which a force perpendicular to the movement and/or displacement can be controllably formed as a resistance between the body and in particular the housing and the pad against movement and/or displacement against each other. The means may preferably have magnetic devices controllably coupled to one another in the housing and in the pad, which are configured in particular as controllable electromagnets or as a ferromagnetic layer. However, it is also conceivable to use means having an electrostatic interaction.

Materials in the real world have a thermal conductivity which a human can sense when touching the material. The thermal conductivity of a material can be sensed both when the material is hot, causing a heat flow from the material into the human skin, and when it is cold, causing an opposite heat flow from the human skin into the material. To provide the most realistic simulation of a virtual material surface a corresponding thermal interaction between the user and his hand with the surface of the input/output device is also controlled.

Thus, it is provided according to another advantageous development of the input/output device, that a fifth actuator is configured for tactile simulation of thermal conductivity of a material surface.

The fifth actuator is configured for this purpose to controllably form as a tactile perceptible heat flow on or in the body of the input/output device, and in particular on or in the housing or its first part or upper part.

The fifth actuator for generating a heat flow may have a means by which a quantity of heat can be supplied to or discharged from the body and in particular the housing. The means may preferably be or have a Peltier arrangement, and namely with at least one controllable Peltier element, wherein the respective temperature and/or heat quantity to be set is controllable by configuring the polarity and/or the strength of the control voltage of the Peltier element.

The disclosure further relates to an operating method for a manually operable tactile input/output device of or for a data processing system and in particular for a tactile computer mouse according to the present disclosure.

In the disclosed operating method, actuators of the underlying input/output device are jointly controlled so that they cause at least temporarily a change haptically perceivable by a user in manual contact with the housing of the input/output device, by which simultaneously at least two and in particular up to all of the five tactile perception dimensions, namely microscopic roughness, macroscopic roughness, friction, hardness and heat, are simulated.

The actuation of actuators of the input/output device can be based on various aspects.

It is thus possible, according to a preferred embodiment of the operating method, to use one or more data sets, in particular in the manner of or on the basis of a database, which reflect an association between materials and parameters which are representative of one or more of the five tactile perception dimensions, i.e. microscopic roughness, macroscopic roughness, friction, hardness and heat of the respective materials. In each case, the parameters suitable for a material surface can be selected and used to derive control data or control signals, on the basis of which the actuators are controlled, in order to generate a sensation appropriate to the selected material surface via the tactile perceptibility for a user on the input/output device.

Alternatively or additionally, it is conceivable that a position, orientation and/or movement of the input/output device or of a body, in particular with respect to a base pad, and/or an associated position, orientation and/or movement of a pointer in a data area, in particular a graphics memory, and/or on an optical display of an underlying data processing system, are taken into account. Through these measures, it is possible to select a material surface and its parameter set as a function of a position of the input/output device as such or of a part thereof and/or of a pointer in a data space, the position of which correlates with the position of the input/output device or part thereof.

Additionally or alternatively, the tactile perceptions imparted via the input/output device can be combined with other perceptual dimensions in order to increase the degree of reality of the simulation of material surfaces.

Thus, it is provided in a particularly preferred embodiment of the operating method that additionally a visual-optical and/or acoustic output is effected simultaneously with the actuation of actuators of the input/output device, which represents further properties of materials in connection with the actuation of actuators, in particular by controlling an optical-visual display or an acoustic output of an underlying display unit.

Further details, advantages and features of the present disclosure will become apparent from the following description of exemplary embodiments with reference to the drawings. This means, for example, that optical impressions in the form of an image or contour and/or a visual deformation are brought to the visual display. Alternatively or additionally, acoustic aspects can also be represented, for example noises in connection with the contacting with the surface and/or with a movement on the surface in the sense of sliding, rolling or the like.

According to a further aspect of the present disclosure, a corresponding data processing system is also provided. The data processing system is arranged, in particular via a central processing unit of the data processing system, to carry out an embodiment of the operating method.

Alternatively or additionally, the data processing system has a manually operable tactile input/output device and in particular a tactile computer mouse and/or a communication connection to a manually operable tactile input/output device and in particular to a tactile computer mouse.

In a particularly preferred embodiment of the data processing system, a storage means, in particular in the manner of a database, is configured and arranged to store one or more datasets that reflect an association between materials and parameters that are representative of one or more of the five tactile perception dimensions, those being microscopic roughness, macroscopic roughness, friction, hardness and heat of the respective materials.

DETAILED DESCRIPTION

Figure 1:
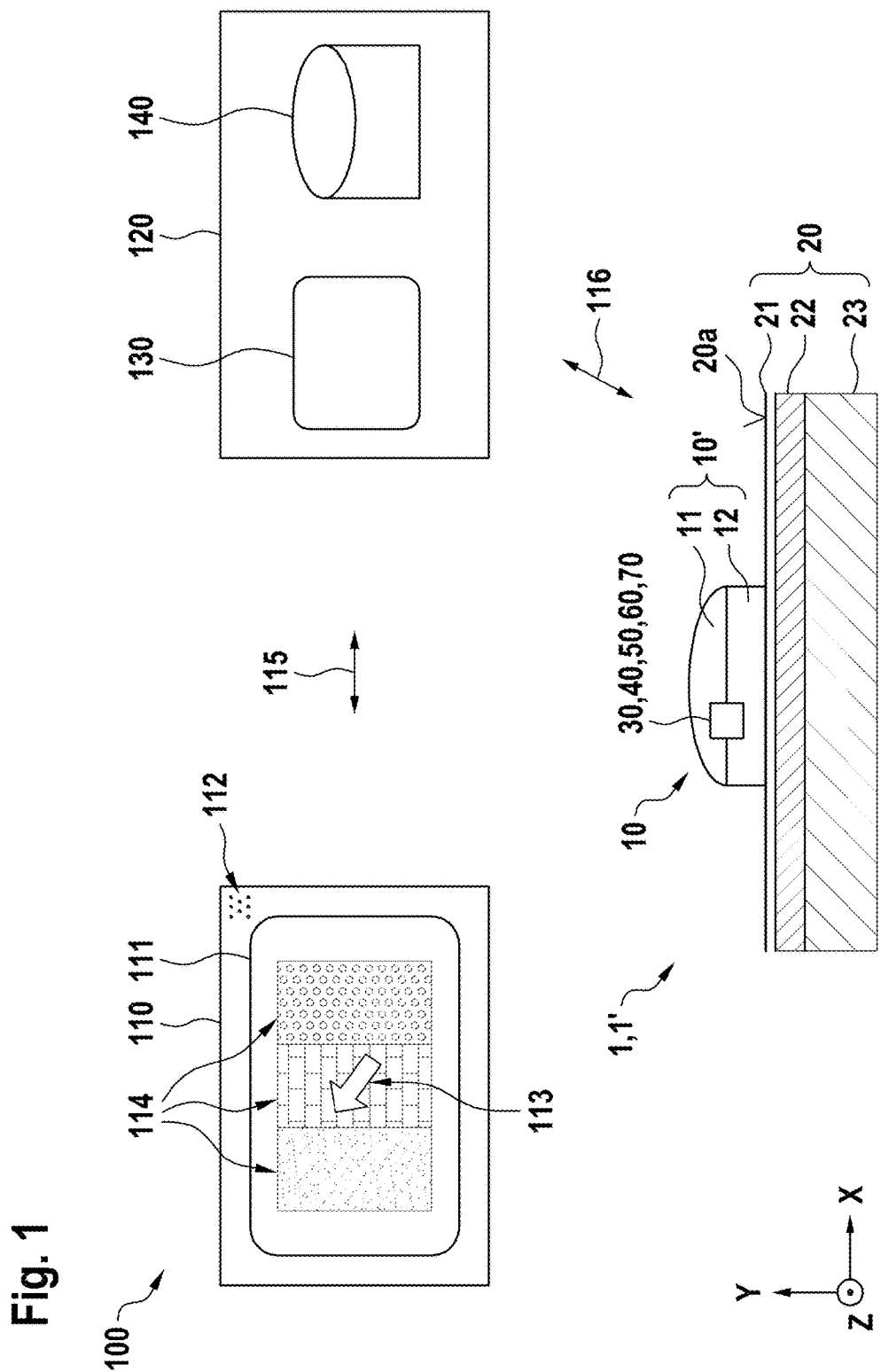
FIG. 1 shows schematically in form of a block diagram an embodiment of a data processing system using an embodiment of the disclosed input/output device.

In the following, with reference to the FIGS. 1 to 18, embodiments and the technical background of the disclosure are described in detail. Identical and equivalent elements and components as well as identical or equivalent working elements and components are designated by the same reference numerals. The detailed description of the designated elements and components is not reproduced in every case of their occurrence.

The illustrated features and other properties can be isolated in any form from each other and combined with each other.

FIG. 1 shows schematically, in form of a block diagram, an embodiment of a data processing system 100 using an embodiment of an input/output device 1.

The data processing system 100, as shown in FIG. 1, includes a processing unit 120 with a central processing unit 130 and a database unit 140. Corresponding memory components can be provided as additional components. Here, memory components are implicitly understood to be part of the central processing unit 130 and are not explicitly illustrated.

Via a detection and/or control channel, which can also be referred to as a communication channel 115, a display unit 110 having an optical output 111, for example in the form of a monitor or the like, and having an acoustic output 112, for example in the form of a loudspeaker or the like, is connected to the processing unit 110. Optical-visual or acoustic aspects of material surfaces can be represented via the outputs 111 and 112, in particular in connection with a corresponding surface simulation application.

Furthermore, an embodiment of the manually operable tactile input/output device 1 is connected to the processing unit 120 via a further detection and/or control channel, which can also be understood as a communication channel 116.

The input/output device 1 of FIG. 1, for example, can be configured in the manner of a computer mouse 1' and can have in connection with a housing 10' for a body 10, a first part 11 as an upper part and a second part 12 as the lower part. In the embodiment according to FIG. 1, the input/output device 1 is shown in connection with a pad 20 having an upper layer or film 21 forming a surface or upper side 20a, an interaction layer 22, for example, in the form of a ferromagnetic layer, and a base 23.

The input/output device 1 of FIG. 1 is configured with a plurality of actuators 30, 40, 50, 60, 70 which are arranged in the housing 10' and jointly controlled to effect at least temporarily a tactilely perceivable feedback by a user in manual contact with the housing 10'. The sensory perception simulates at least two of the five tactile perception dimensions, which are microscopic roughness, macroscopic roughness, friction, hardness and thermal conductivity of a surface of an object.

In FIG. 1, the three spatial directions X, Y and Z are shown, wherein the plane of the pad 20 extends parallel to the XZ plane.

Figure 2:
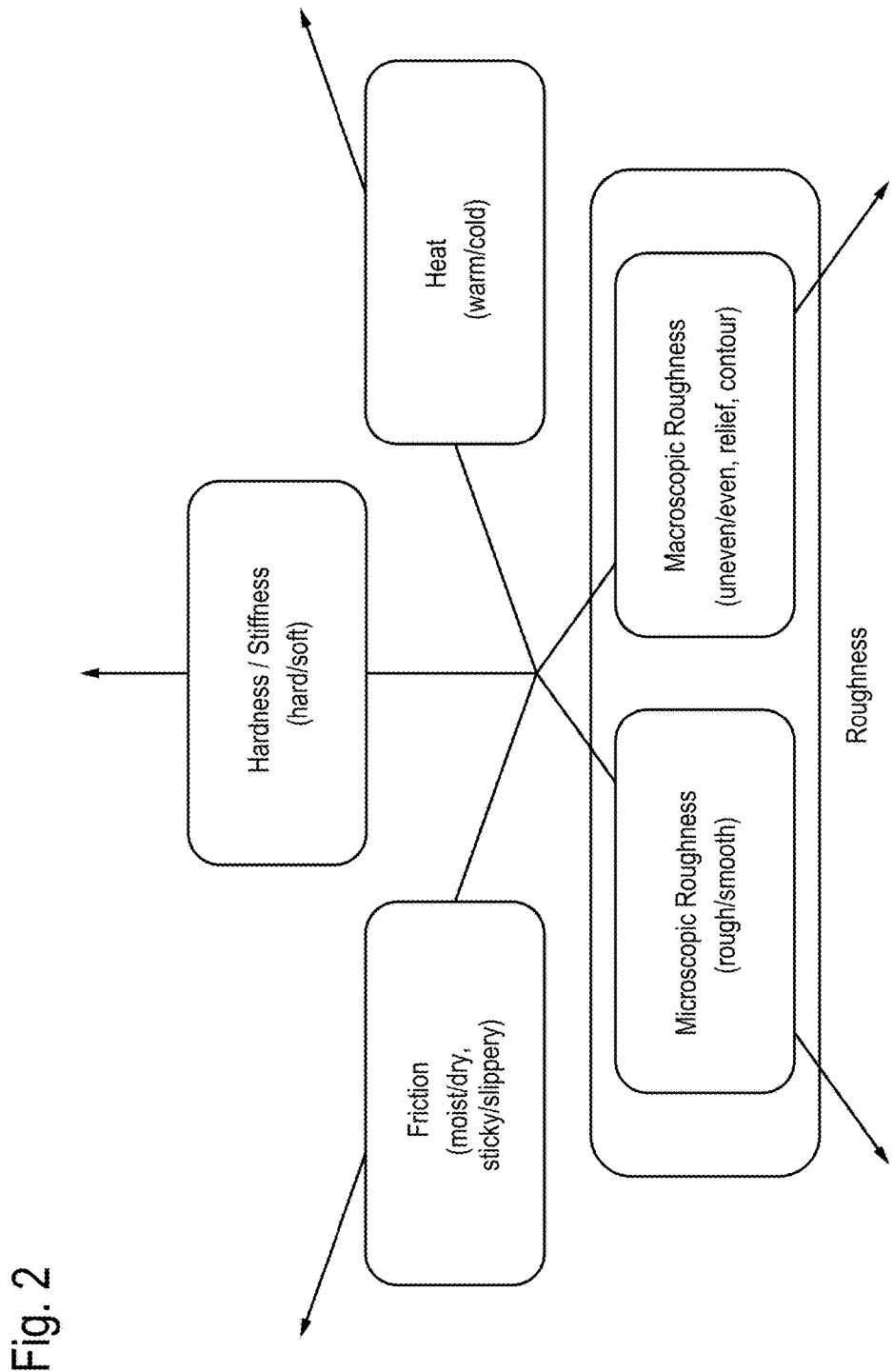
FIG. 2 schematically describes the five dominant tactile dimensions according to Okamoto et al., on the basis of which the tactile sensation of material surfaces can be simulated.

FIG. 2 schematically shows the five dominant tactile dimensions according to Okamoto et al., on the basis of which the tactile sensation of material surfaces can be represented realistically or almost realistically.

Formally, the five tactile perception dimensions can be understood to be
(i) microscopic roughness or micro-roughness, for example, a sense of a surface being rough or smooth,
(ii) macroscopic roughness or macro-roughness, for example, a sense of a surface being uneven, even, contoured, or the like,
(iii) friction, for example, a sense of a surface being moist, dry, sticky, slippery or the like,
(iv) hardness or stiffness, for example, a sense of a surface being hard or soft or the like, and
(v) thermal conductivity, i.e. a sense of a surface being warm or cold and a resulting heat flow.

The five tactile perception dimensions can be represented as dimensions of a five-dimensional parameter space for the complete and realistic or nearly realistic description of properties of material surfaces.

FIGS. 3 to 8 show various views of the structure and the application of embodiments of the input/output device 1 in form of a computer mouse 1'.

The input/output device 1 as shown in FIGS. 3 to 8 includes a body 10 with a housing 10', which has a first part 11 as an upper part and a second part 12 as a lower part.

Figure 4:
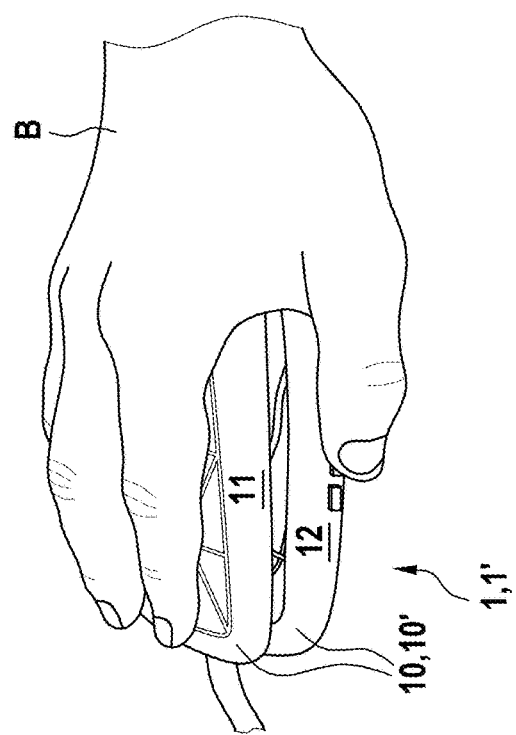
FIGS. 3 to 8 show various views of the structure and the application of embodiments of the input/output device in form of a computer mouse.
Figure 3:
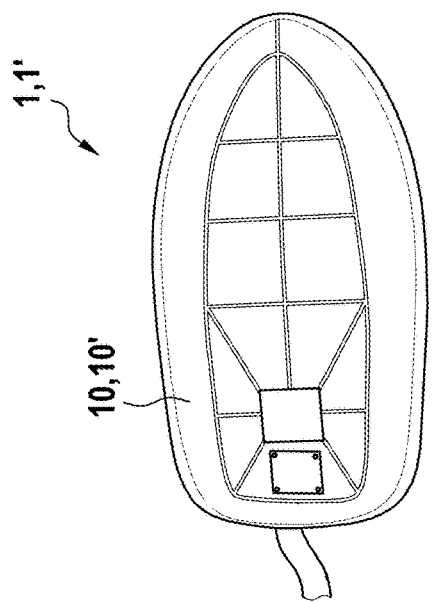

As shown in FIG. 4, a user's hand B touches at least the surface or upper side of the first part 11 or the upper part of the housing 10' of the body of the input/output device 1 in order to manually carry out certain operations and to receive tactile feedback through the hand.

Figure 5:
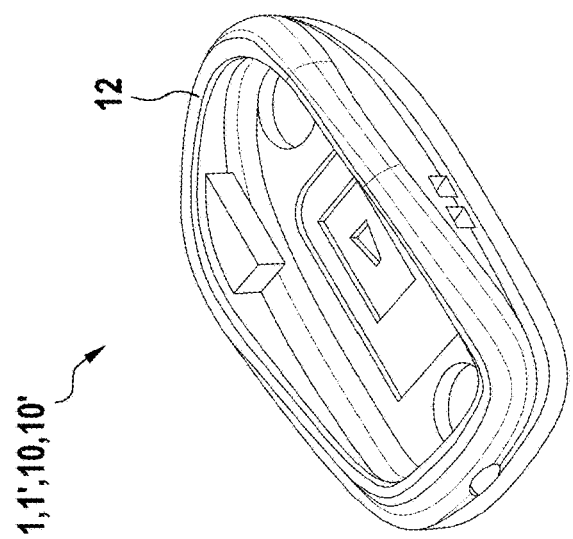
Figure 6:
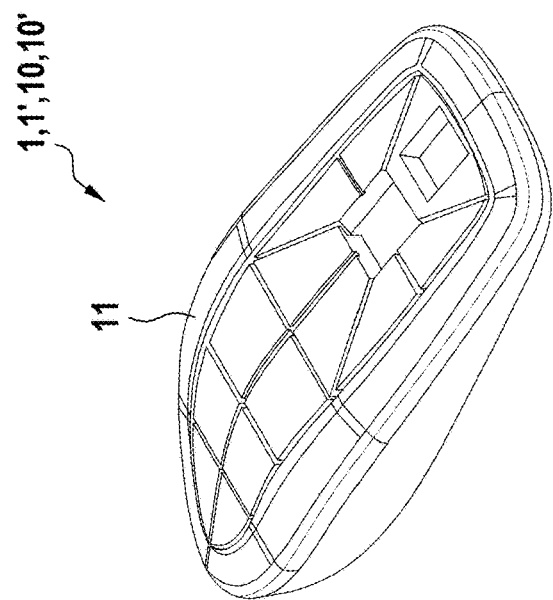

FIGS. 5 and 6 show separated from one another the first part or the upper part 11 and the second part or the lower part 12 of the housing 10' of the body 10 of the input/output device 1 designed as a computer mouse 1'.

Figure 7:
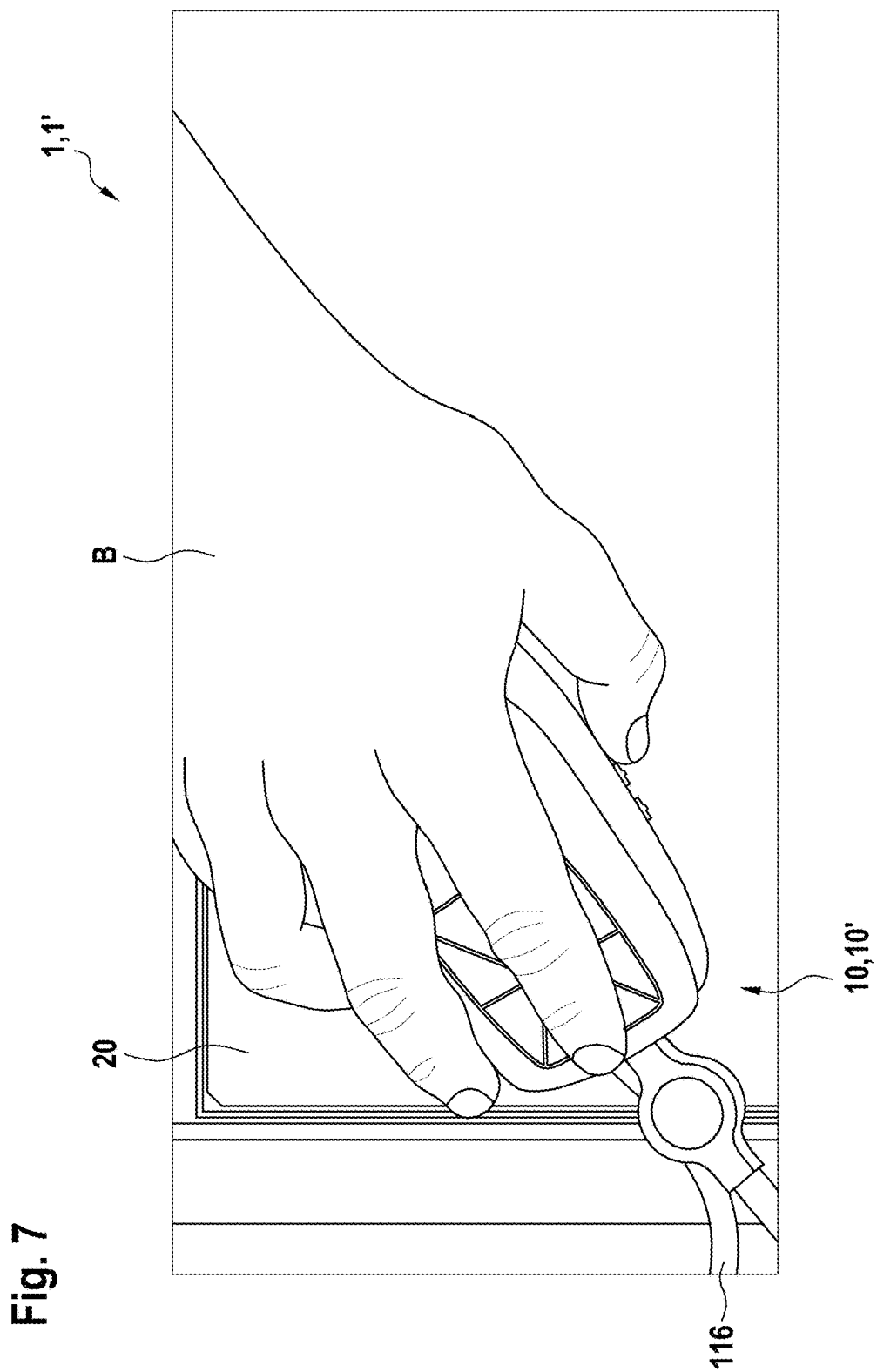
Figure 8:
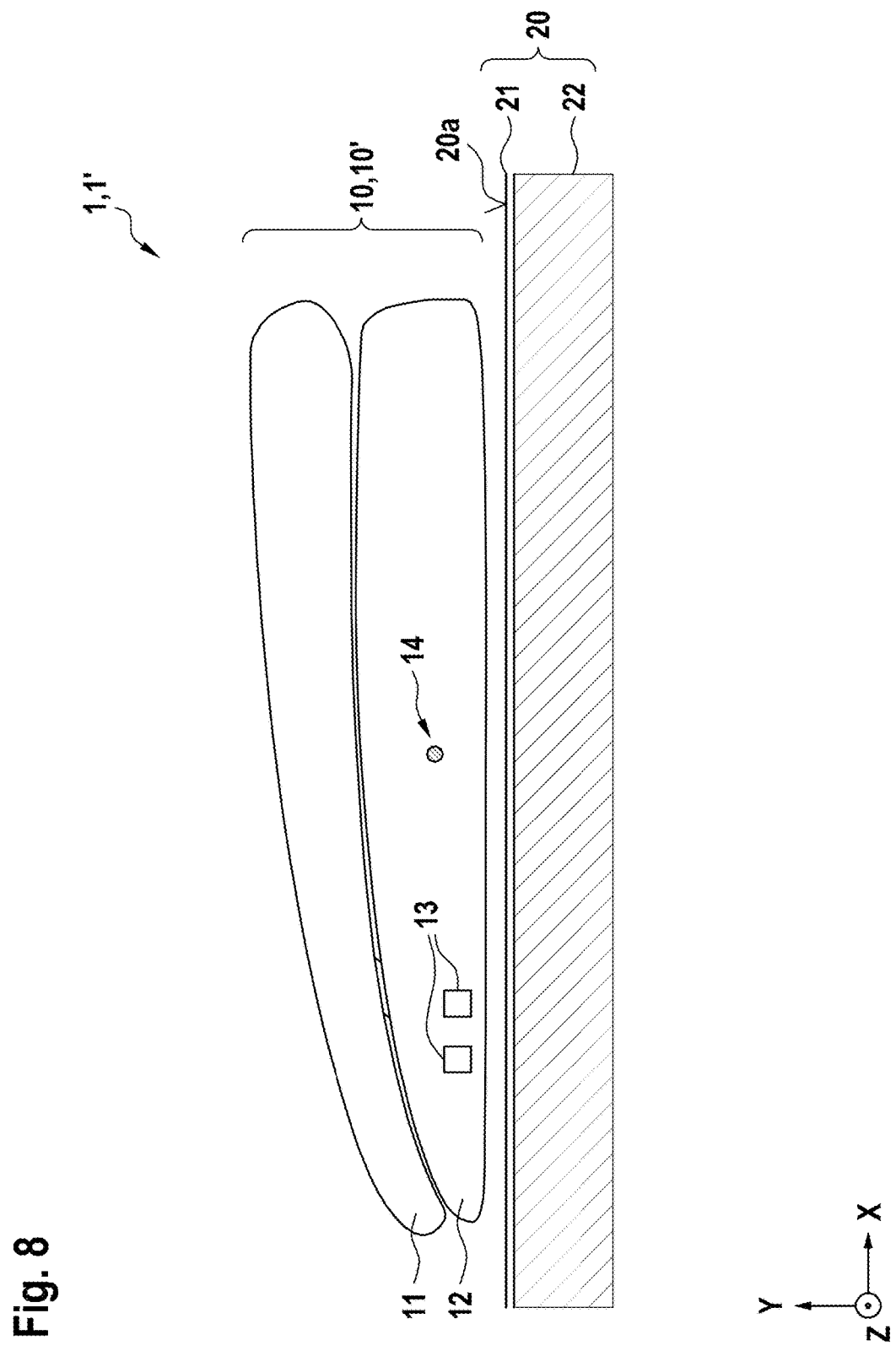

FIGS. 7 and 8 show the body 10 of an input/output device 1 designed as a mouse 1' in cooperation with a pad 20 when operated by a user's hand B. The pad 20 is configured over its upper side 20a to interact with the lower side of the lower part 12 of the housing 10'. The upper side 20a may be formed by a film 21. Below this is an interaction layer, for example, in the form of a ferromagnetic layer 22, the further function of which will be explained below.

FIG. 8 also shows the center of gravity 14 and switches 13 of the body 10 of the input/output device 1. The switches 13 may e.g. be right and left mouse buttons.

FIGS. 9 to 15 show in schematic side views or a plan view different embodiments of the input/output device 1 in form of a computer mouse 1' for the realization of different tactile perception dimensions.

Figure 9:
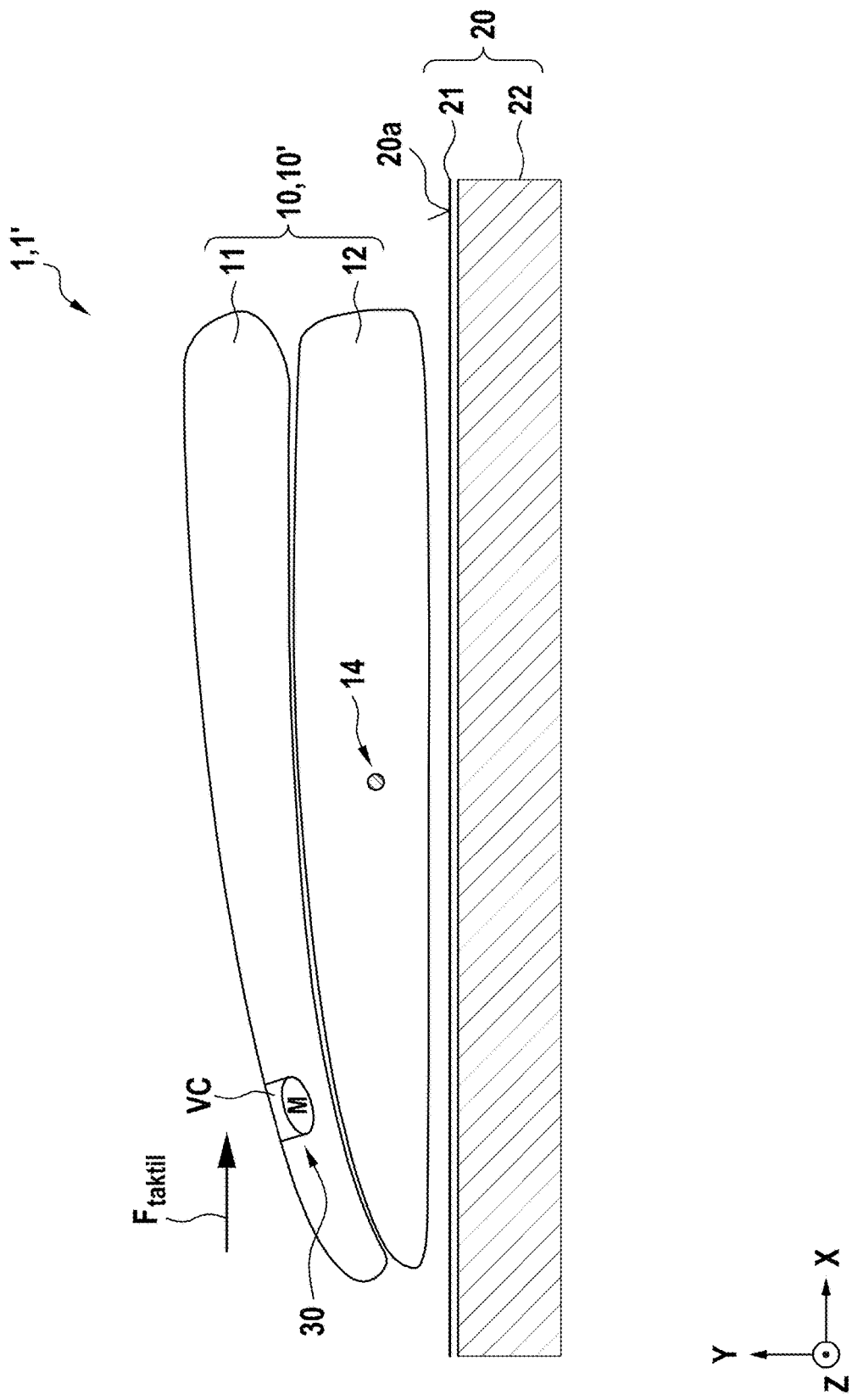
FIGS. 9 to 15 show in schematic side views or a plan view different embodiments of the input/output device in form of a computer mouse for the simulation of different tactile perceptions.

The embodiment of the input/output device 1 according to FIG. 9 is configured in the region of the first or upper part 11 of the housing 10' of the body 10 as a first actuator 30 in form of a voice coil arrangement having a voice coil VC and a vibration mass M, in order to generate in operation a tactile force $F_{taktil}$ perceptible by a user's hand B, for example, by providing a sense of a vibratory force and/or inertial force and to present and simulate the tactile perception of microscopic roughness or coarseness.

The voice coil VC is excitable by applying an electrical voltage to cause mechanical vibrations. In contrast to conventional force-feedback arrangements, a vibration modulation can be generated including modulation with multiple frequency components in the range perceptible by humans, for example, between 0 Hz and 600 Hz. The vibration modulation may depend on the movement of the input/output device 1 and thereby simulate complex surface structures.

Figure 10:
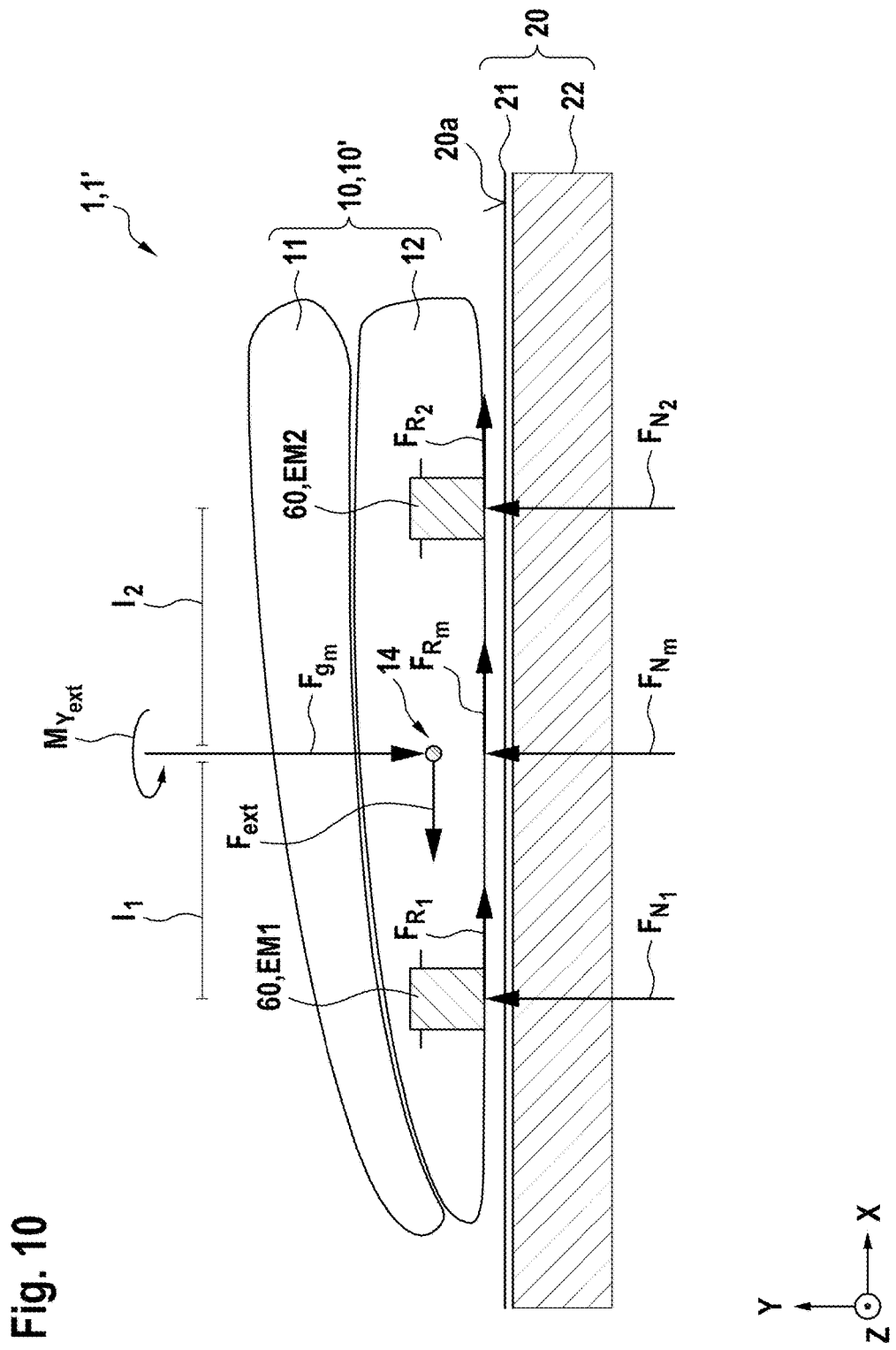

In the embodiment according to FIG. 10, the input/output device 1 has an arrangement of first and second electromagnets EM1, EM2 as a (fourth) actuator 60 in the second part or lower part 12 of the housing 10'. The actuator 60 can interact with a ferromagnetic layer 22 of the pad 20 arranged below the film 21 forming the surface 20a of the pad 20.

During operation, the electromagnets EM1, EM2 of the (fourth) actuator 60 can be subjected to electrical voltages or currents, optionally in a modulated manner, in order to generate normal forces FN1, FN2 perpendicular to the surface 20a and to the bottom side of the lower part 12 of the housing 10' and thus simulated friction forces FR1, FR2. During operation, depending on the underlying material properties, the electromagnets EM1, EM2 are respectively controlled to represent and reproduce a different and material-dependent resistance to displacement or movement of the body 10 on and against the pad 20 in magnetic interaction between the electromagnets EM1, EM2 and the ferromagnetic layer 22. In this way, the tactile perception of friction can be represented in tactile perceptible manner for a user.

Figure 11:
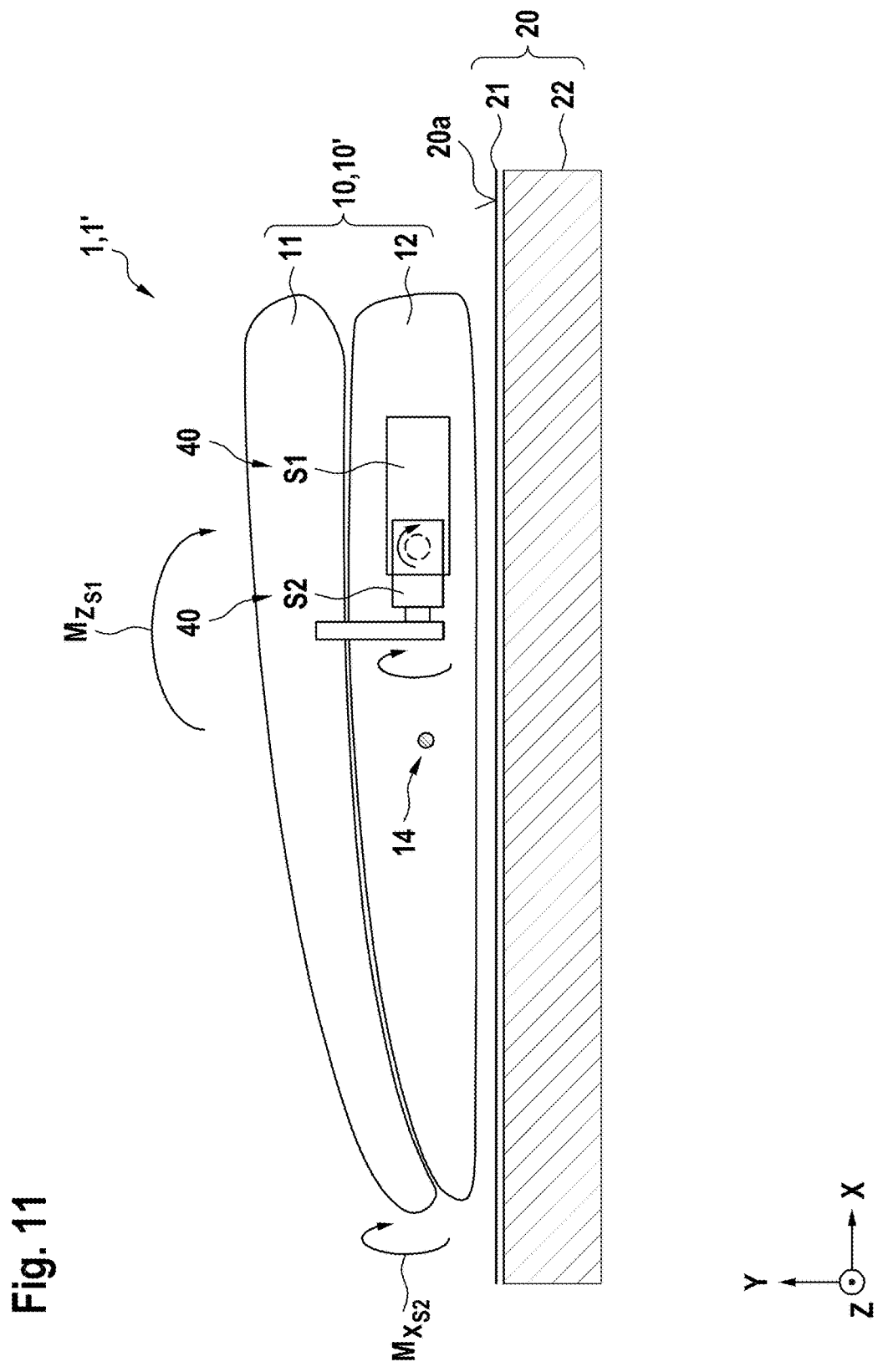

In the embodiment according to FIG. 11, the input/output device 1 has, in the second part or lower part 12 of the housing 10' of the body 10, a (second) actuator 40 having a first and a second servomotor S1, S2 which can effect a mechanical coupling between the upper part 11 and the lower part 12 of the housing 10' and their tilting or pivoting around tilt or pivot axes parallel to the Z-axis for the servomotor S1 or parallel to the X-axis for the servomotor S2, in order to thereby generate the tactile perception of macroscopic roughness or coarseness, for example, in the sense of a contour or an undulation.

Figure 12:
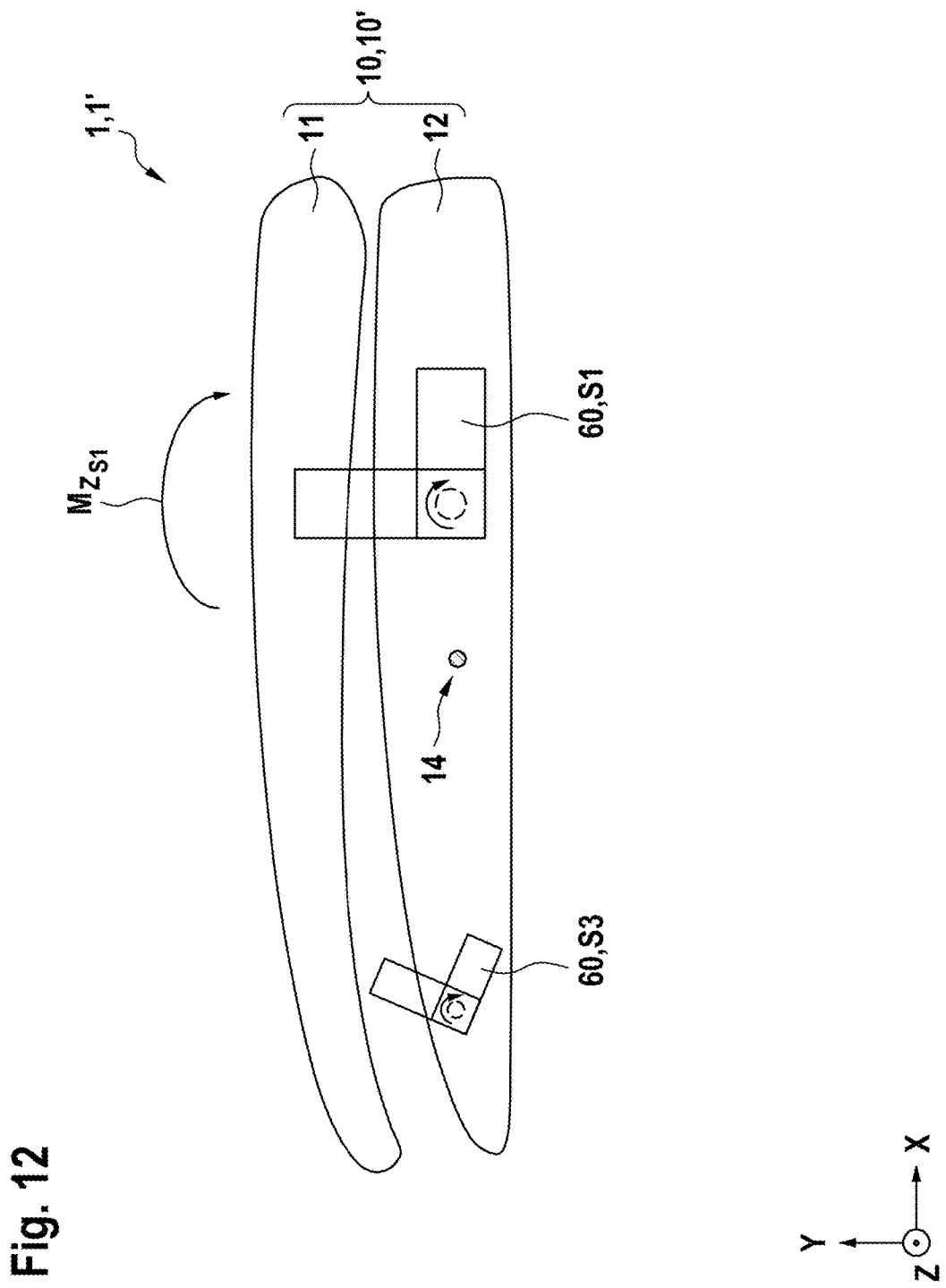
Figure 13:
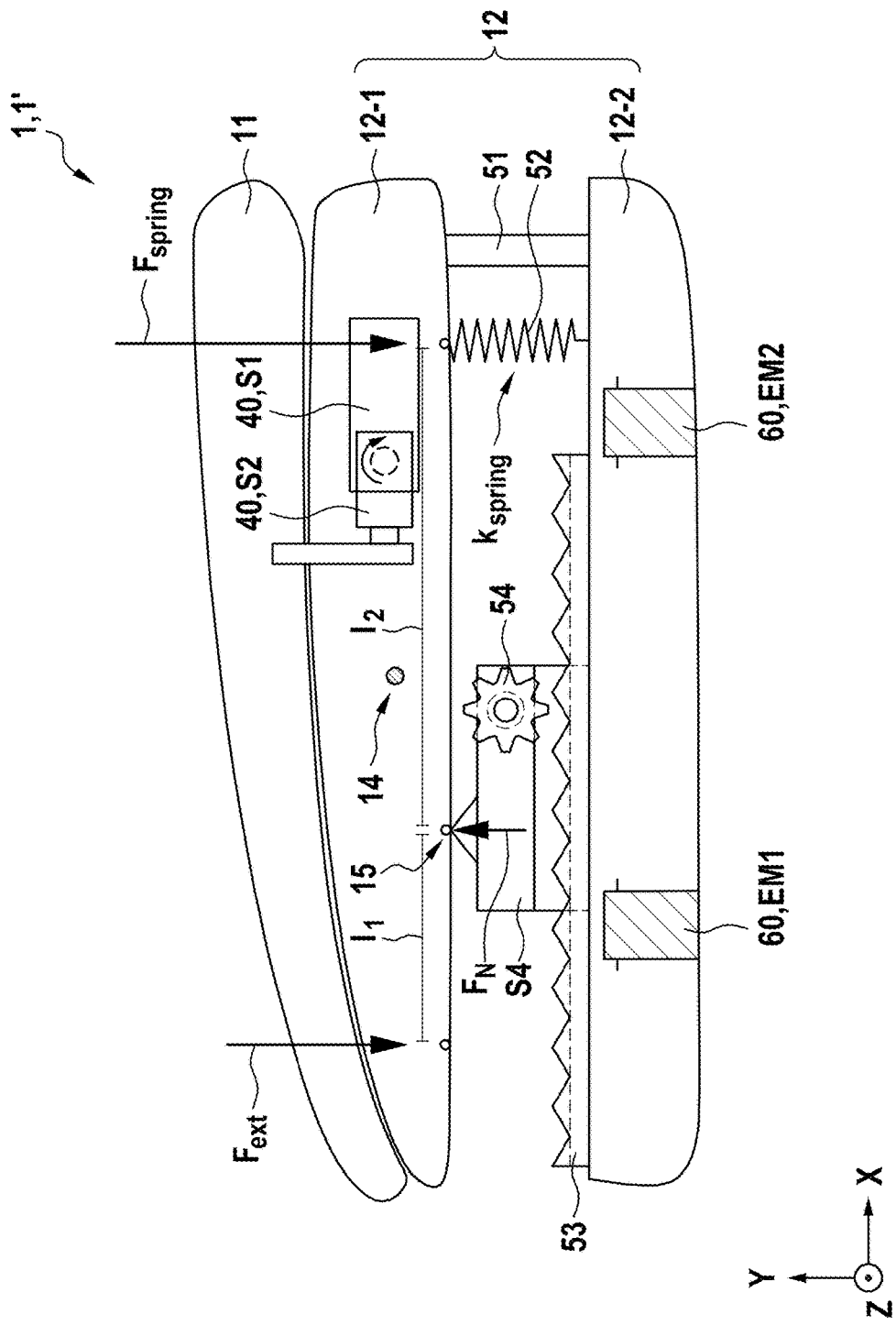
Figure 14:
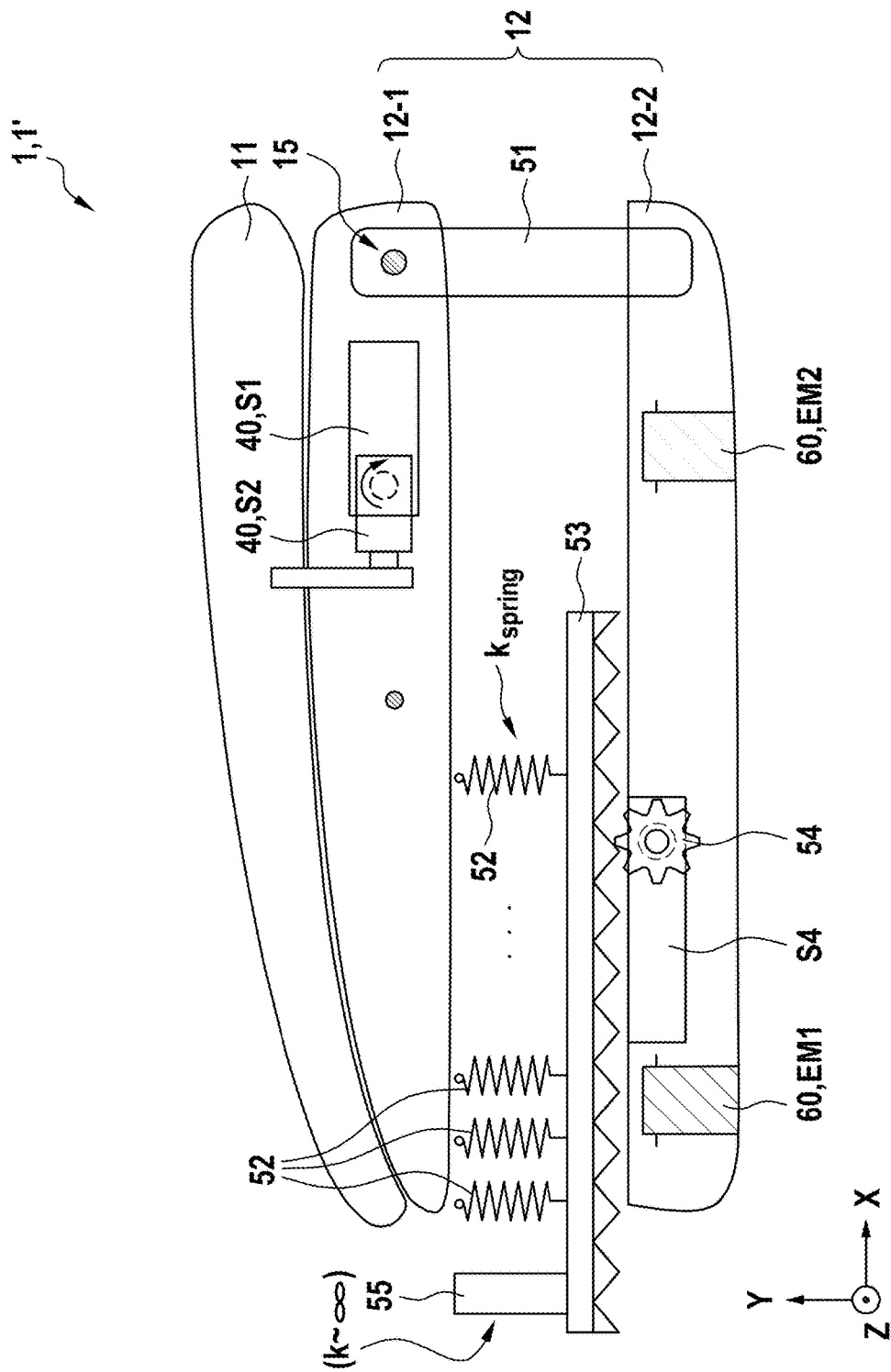

FIGS. 12 to 14 show embodiments of the input/output device 1 according to the invention, which are arranged to simulate the tactile perception of hardness or stiffness of a material surface and have a (third) actuators 50 for this purpose.

In the embodiment according to FIG. 12, the first servomotor S1, which has already been used in connection with the second actuator 40 from FIG. 11 for generating the tactile perception of macroscopic roughness, forms a part of the third actuator 50, together with an additional third servomotor S3.

In operation, the finite stiffness of the first servomotor S1 (and optionally also the second servomotor S2) is used to counteract a manual actuation by the user with regard to a manually tilting the first and second parts 11, 12 of the housing 10' of the body 10. A tilting or pivoting of the first and second parts 11, 12 against each other can be completely blocked by a corresponding position of the third servomotor S3 of the third actuator 50, possibly to represent one or more axes and thereby a maximum hardness and to bring this to the tactile perception of the user's hand B.

In the embodiment according to FIG. 13, a variable hardness can be simulated for tactile perception via the interaction of a spring 52 with a spring constant $k_{spring}$, a support element or bearing 51 and a pivot point 15 adjustable via a fourth servomotor S4 with gear wheel 54 in interaction with a toothed rack or cograil 53 with corresponding levers l1 and l2. Depending on the position of the pivot point 15, adjusted and positioned along the toothed rack 53, different counter-torques with the manually tilting of the upper part 11 and lower part 12 of the housing 10' by the user are overcome via the levers l1 and l2 and via the spring constant $k_{spring}$ of the spring 52, whereby the impression of a different hardness of an associated material surface is represented.

In the embodiment according to FIG. 13, the electromagnets EM1, EM2 of a fourth actuator 60 for friction and the first and second servomotors S1, S2 of the second actuator 40 for macroscopic roughness are still shown; however, their presence is not mandatory.

As shown in FIG. 14, a variable hardness of an associated material surface can also be simulated by an ensemble of a plurality of springs 52 of the third actuator 50, in cooperation with a support or with a bolt 55 which are mounted on a cograil or toothed rack 53. The fourth servomotor S4 may drive a gear wheel 54 and thereby displace the cograil or toothed rack 53 and with it a number of springs 52 which are arranged on the toothed rack 53 between two housing parts 12-1, 12-2 of the lower part 12 of the housing 10' of the body 10. As the number of springs 52 increases, a tactile perceptible increased hardness of the associated material surface is simulated. By inserting the support or the bolt 55 with quasi infinitely high rigidity, a maximally stiff or hard material surface is simulated. A pivoting takes place around the turning point or pivot point 15 of the support member or bearing 51.

Figure 15:
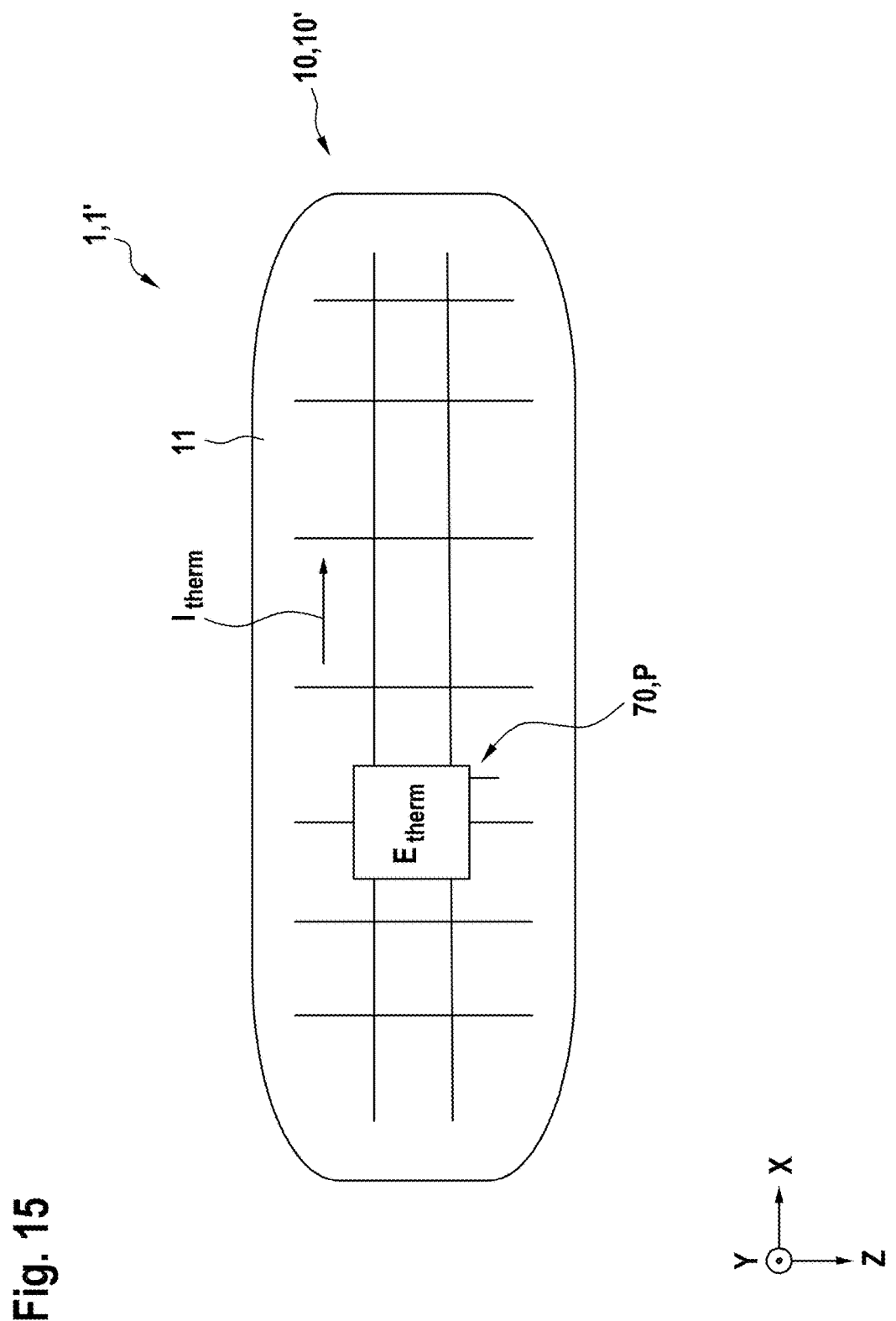

The tactile perception of a heat flow or thermal conductivity of a material surface can be generated as a tactile perception with the input/output device 1 in the manner of a computer mouse 1' through the embodiment according to FIG. 15.

For this purpose, heat quantity or thermal energy $E_{therm}$ is introduced via a fifth actuator 70 in the region of the upper side of the upper part 11 of the housing 10'. Depending on the type of heat quantity, a corresponding heat flow $I_{therm}$ can be generated in the upper part 11 with a corresponding heat quantity distribution and/or temperature distribution. Through this, the sensation of more or less heat conductive surface arises with manual contact by a user. The arrangement can be realized using a fifth actuator 70 in the manner of a Peltier arrangement using one or a plurality of Peltier elements P.

Among other things, this measure can be used for the simulation of metallic surfaces, for example, with a heat dissipation, and/or during movement, the simulation of heating by heat influx or reduced heat dissipation in rough materials, such as with sandpaper or textiles.

Figure 16:
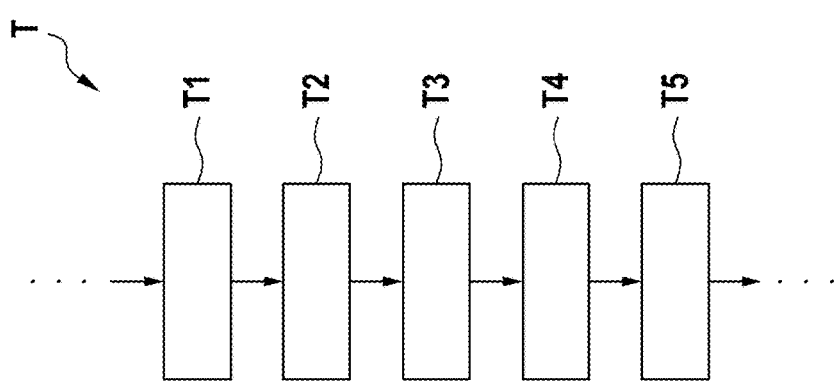
FIG. 16 shows a block diagram of an embodiment of the operating method.

FIG. 16 shows a block diagram of an embodiment of the operating method T with steps T1 to T5.

In a first step T1, the position, the orientation and/or the movement of the input/output device 1, in particular the computer mouse 1' and preferably the body 10 or housing 10', and/or a pointer 113 are determined in a data area or display area 114.

In a second step T2, a material association is made on the basis of the determined position, orientation and/or movement. This means that at least temporarily a material is associated with the determined position, orientation and/or movement in a predefined manner.

In a third step T3, a parameter set is determined corresponding to the associated material, in particular from a database unit 140, which describes the tactile perception dimensions of the respective associated material or a part thereof.

In a fourth step T4, a control data set is generated from the parameter set describing the tactile perception dimensions in order to control the actuators 30, 40, 50, 60, 70 of the input/output device 1 for the tactilely perceivable simulation of the properties of the associated material surface in the following fifth step T5 by the control data set.

The sequence of steps T1 to T5 can be carried out repeatedly in a total procedure in the manner of a conditional loop, that is, the position, orientation and/or movement can be constantly determined and checked to update a material association and thus the parameter set used to actuate the actuators 30, 40, 50, 60, 70 in real time.

Figure 17:
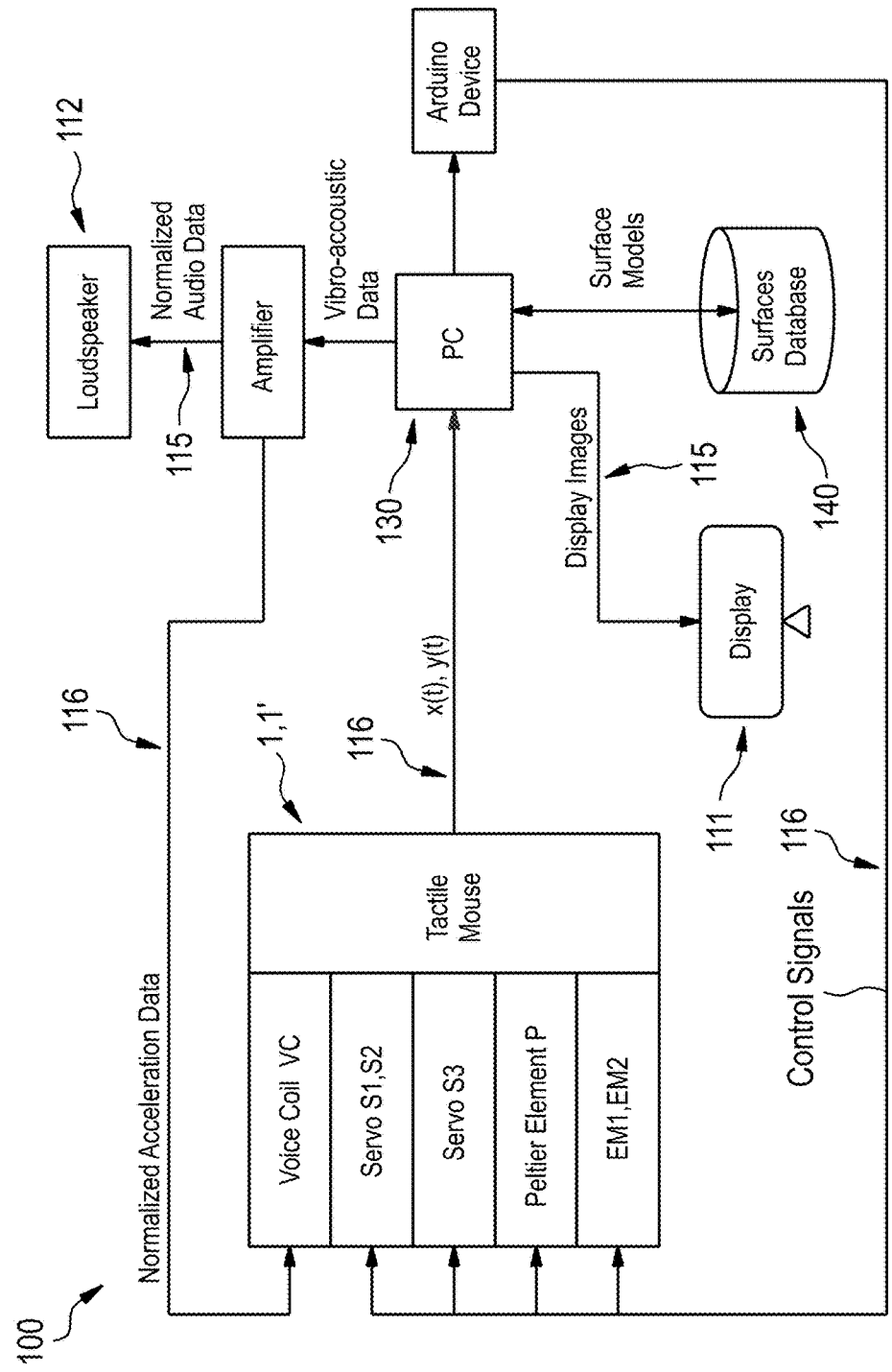
FIG. 17 is a block diagram, showing another embodiment of the data processing system in an application in the form of a surface simulation application.

FIG. 17 shows, in form of a block diagram, another embodiment of the data processing system 100 in an application in the manner of a surface simulation application, and in particular using an embodiment of the operating method T.

Figure 18:
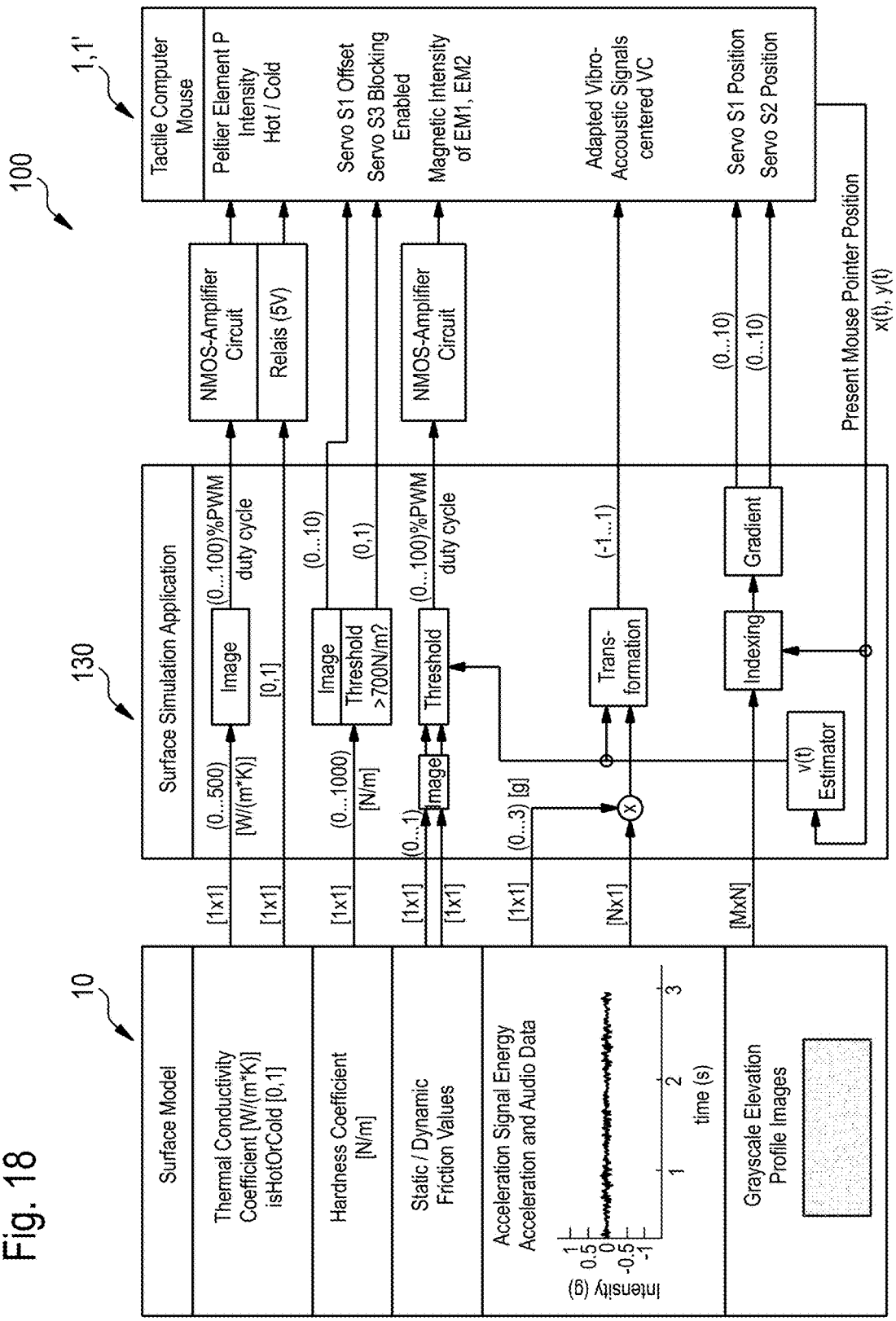
FIG. 18 is a schematic block diagram, showing aspects of an embodiment of the operating method with a focus on the simulation of a surface model in a surface simulation application for actuating an input/output device in form of a tactile computer mouse.

FIG. 18 shows, in form of a schematic block diagram, aspects of an embodiment of the operating method T with a focus on the simulation of a surface model in a surface simulation application for actuating an input/output device 1 according to the invention in form of a tactile computer mouse 1'.

These and other aspects of the present disclosure are further illustrated by the following description:

The present disclosure relates in particular to a tactile feedback input and/or output device 1 for a data processing system 100 and preferably a tactile feedback computer mouse 1'.

In this specification, the term computer mouse 1' is mentioned purely as representing a general input and/or output device 1 for a data processing system 100. This representation is chosen for convenience and is not limiting with respect to the subject matter of the invention. Instead of a computer mouse 1', any other input and/or output device 1 can be provided for a data processing system 100 and used in the applications for the realization of the inventive concepts.

Tactile Computer Mouse

In particular, the present disclosure provides a concept for the artificial creation and/or simulation of tactile properties of real object surfaces by a new input and/or output device 1 and in particular a novel computer mouse 1'.

A computer mouse 1' is one of the standard interaction devices for human-machine interaction or human-computer interaction (HCI).

A visual feedback of the current position of the mouse pointer is displayed, for example, by a computer monitor 110, 111.

However, applications that provide the option to interact with objects would benefit from additional tactile feedback about the object and surface properties.

Humans recognize and process various touch-related impressions such as roughness, friction and heat in parallel with visual and acoustic information. In addition to the realistic surface simulation or the tactile extension of common user interfaces, a tactile computer mouse 1' can enhance immersion in virtual environments (VE).

Known virtual reality devices lack tactile feedback for extending simulated realism.

The proposed concept according to the disclosure, which includes necessary hardware, algorithms and underlying models, can be adapted to various possible applications. Some exemplary applications are briefly outlined below.

Application Examples

Adding comprehensive tactile feedback to a common computer mouse that goes beyond simple vibrations enables a variety of enhancements to existing applications.

(1) Advanced Gaming, User Interface Enhancement and Use in Virtual Environments.

Virtual environments should convey the most realistic as possible impressions to people. For example, adding thermal impressions and/or impressions of a fine roughness or coarseness while moving over a virtual sand surface can enhance the perceived realism in addition to the visual and acoustic information.

Furthermore, a tactile computer mouse 1' may inform the user about the condition of an avatar in an artificial environment or VE.

The upper body parts of the tactile computer mouse 1' can be moved in order to indicate different physical inclinations, such as those of a spaceship.

A modifiable friction coefficient between the mouse lower side and a mouse pad 20 may indicate that an avatar is loaded with too many virtual objects and therefore can move only slowly or more slowly.

With regard to the computer game or gaming industry, the present disclosure proposes, among other things, to expand the tactile computer mouse with additional input sensors.

Thus, it is conceivable to use an inertial measurement unit, which can also be referred to as IMU, to determine a current state of rotation of the computer mouse 1' and to detect whether the user has lifted the tactile computer mouse 1' from the mouse pad 20, for example, to represent a hopping motion in a virtual reality or environment, for example in a computer game.

An inertial measurement unit, for example, has a combination of inertial or inertial sensors such as acceleration sensors and gyroscopes or the like to detect the position and/or inclination of an object, here in the XYZ directions, or accelerating motions, e.g., a "hopping".

Furthermore, force sensitive resistance (FSR) can, for example, be attached to the sides of the computer mouse 1' to allow different pressures to act on the computer mouse 1' and accordingly in a virtual environment, for example, in a computer game, to perform actions.

According to the disclosure, such input modalities can be realized without problems and extend the spectrum of feedback and the initiation and execution of actions in a virtual environment.

Apart from gaming VE, the extension of tactile output properties enhances everyday man-machine interactions. The simulation of different frictional forces by means of the computer mouse 1' can be used, for example, to change the drag-drop experience, for example, according to the file size of the file being dragged. The computer mouse 1' according to the invention can be extended by different thermal conductivities, for example, to indicate the state of a button of a user interface (UI).

(2) Tactile Simulation of Surfaces for Applications in E-commerce

E-commerce platforms typically provide visual feedback on their offered products. A tactile computer mouse 1' or any tactile input/output device 1' can be used to represent the surface properties to potential buyers, e.g., the fine roughness of a fabric in online shopping.

In this context, a tactile computer mouse must go beyond the use of simple vibratory motors to give a correspondingly rich tactile feedback to the human user.

Recent findings in this area show that a realistic tactile feedback, in particular the tactile impression of roughness, can be realistically displayed with so-called voice coil actuators.

The necessary signals can be recorded with acceleration sensors, which can also be used for surface classification or modeling methods.

Other actuators 70 such as Peltier elements P can be used to display other relevant impressions such as heat or cold.

(3) Teleoperation

Teleoperation systems are controlled, for example, via touch-sensitive display devices, e.g., via touch panels, touch displays or joysticks.

Tactile feedback by a known HCI device, such as a computer mouse 1', can intuitively increase the controllability of these robotic systems because many people are familiar with the handling of computer mice 1'.

For example, if a robot is equipped with thermal sensors, tactile heat feedback may be given to warn the operator B that he is approaching a hot object surface.

In addition, the tactile computer mouse 1' as disclosed can increase its simulated friction to indicate to operator B that the teleoperated robot is reaching a mechanically allowable limit.

(4) Support Visually Impaired Persons

Common input and/or output devices for data processing systems 100 and in particular common computer mice 1' and applications generally do not offer any supported operation for visually impaired people.

A correspondingly adapted tactile computer mouse 1' can additionally physically indicate the position of a mouse pointer 113 by tilting the upper mouse body part 11 in accordance with the current position of the mouse pointer 113 on the screen 110, 111.

In addition, the UI or interface elements of a program can be represented by various types of vibration and thermal feedback.

Additionally, in combination with tactile feedback, audio feedback may be used to support a visually impaired person during the performance of a desired task.

Core Aspects of the Disclosure

The human sense of touch consists of a number of different tactile dimensions, such as hardness, roughness, friction or thermal conductivity, which are specific to a surface.

In accordance with the present disclosure, a novel input/output system is introduced to simulate these tactile characteristics to a user while interacting with a computer or a general data processing system.

A concept is proposed in which in particular prerecorded signals are used for tactile simulation, e.g., acceleration signals recorded with a device which sweeps over a surface. Furthermore, the disclosure proposes a corresponding modeling method and the tactile simulation of underlying models with a tactile input/output device 1 for a data processing system 100, in particular with a tactile computer mouse 1' and a graphical user interface.

The proposed tactile computer mouse 1' is equipped with a range of actuators 30, 40, 50, 60, 70 to output tactile properties to a user B. Insights about the five dominant tactile dimensions of human surface perception are used in this case. A device capable of generating a corresponding feedback to these tactile dimensions is considered realistic with respect to the task of artificial surface simulation.

The approach according to the disclosure preserves the input capabilities of a common computer mouse, e.g., the two-dimensional input position and clicking with the mouse buttons, but improves their output capacities. The tactile computer mouse can be intuitively integrated into other software applications, for example, to improve computer games, common user interfaces or teleoperation systems, since the proposed concept can be integrated into these applications through the use of standard communication protocols, e.g., via USB and/or general serial communication. In addition, low cost components can be used to realize the disclosed concept and thus provide an affordable solution for a wide range of applications.

Algorithms are also provided which are arranged to build up the model simulation of a surface.

Further Technical Background

In general, conventional devices at most reproduce a basic tactile feedback in the form of a single modulated vibration for a human user.

However, current research in the field has shown that a realistic rendering of, for example, tactile surface information requires a combination of different perceptual dimensions, such as hardness/stiffness, friction, coarse surface texture perception, heat and fine roughness perception.

This is described in detail, for example, in the publication "Psychophysical dimensions of tactile perception of textures" by Okamoto, Nagano and Yamada, IEEE Transactions on Haptics, Volume 6, pages 81 to 93, of March 2013.

In contrast to the present disclosure, known computer mice are at most capable of reproducing a very limited subset of the rich tactile dimensions described by Okamoto et al. as feedback, have no tactile perceptual background or provide no reproducible concept for a realistic surface simulation.

Background: Psychophysical Dimensions of Tactile Surface Perception

The above-mentioned study by Okamoto et al. shows that humans take tactile information from different perceptual dimensions, which result from the interaction of, for example, the hand with a surface, as shown in FIG. 2.

FIG. 2 thus shows the five dominant tactile dimensions on which the present disclosure is based.

According to the disclosure, an actuator 30, 40, 50, 60, 70 and/or an actuator action is associated with each tactile dimension.

In particular, each tactile dimension is associated with its own tactile actuator 30, 40, 50, 60, 70 and/or its own actuator action in the manner of a one-to-one association in order to achieve a realistic simulation and tactile simulation of surfaces by means of an input/output device 1 and in particular by means of a computer mouse 1'.

The individual tactile dimensions according to Okamoto are explained in the following:

Macroscopic roughness or coarseness consists of or can be derived, for example, from the visually perceptible height profile information, in particular greater than 1 mm of visible surface properties, and the regularity of a surface. The surfaces can, for example, be regularly structured, have perceptible irregular patterns or are completely flat. Contour shapes, undulations, ripples and the like are also considered in this context.

Microscopic roughness or coarseness, also known as fine roughness, can be characterized by the occurrence of high frequency vibrations and gives surfaces a specific tactile appearance during sweeping. Surfaces can be perceived from the feeling of intense roughness or even pain up to as completely smooth or fine.

Friction forces the human finger to apply more or less lateral force during the sliding movement. The extreme limits are referred to as slippery up to sticking or adhesive.

Thermal conductivity is recognized by the thermal receptors in human fingers. The ambient temperature and the thermal conductivity determine how warm or cold a surface is perceived through direct contact.

Hardness or stiffness is mainly perceived during a static pressure on the surface and is related, for example, to the local spring constant of the surface according to Hooke's Law.

Implementation: Tactile Input and/or Output Device, in Particular Computer Mouse A tactile computer mouse 1' is described as an example of a general tactile input/output device 1 according to FIGS. 3 and 4. The embodiment of the tactile input/output device 1 shown there can be used for surface simulation.

It should be noted that the embodiment shown in the figures has all the capabilities that can also be used for the other aforementioned applications, e.g., for the teleoperation scenario.

Mechanical Construction and Design

For example, a set of actuators 30, 40, 50, 60, 70 may be embedded in a 3D printed mouse housing 10' as shown in FIGS. 5 and 6. FIGS. 5 and 6 show lower and upper mouse body parts 11, 12, which as such form two housing halves of the computer mouse 1'. The technical implementation of the five tactile dimensions and the corresponding physical framework considerations are described below.

Actuators Used for the Simulation of the Five Tactile Dimensions

The following table lists a possibility of using actuators 30, 40, 50, 60, 70, with which the five tactile dimensions can be simulated, either individually or by interaction with one another. All components can be operated and driven independently of each other.

The actuators 30, 40, 50, 60, 70 for tactile simulation used in the respective embodiments may be embedded in a 3D printed overall housing 10' with mouse lower side 12 and mouse upper side 11 and be internally wired. Standard mouse functions, such as left and right clicking, are not affected by the actuators, but are shifted to the side of the mouse 1'. Note, however, that the mouse wheel may require a rearrangement, if necessary.

| Tactile dimension | Actuator | Description |
|---|---|---|
| Macroscopic roughness | two servos (AS0403) | Two physically connected servos are used to change the inclination (tilt, roll) of the upper mouse part. |
| Microscopic roughness | a VCA (NCM02-05-005-4JB, H2W Technologies) | A VCA is used to display fine roughness vibration (between 1 and 600 Hz) when the mouse is moved. |
| Friction | two electromagnets (Intertec ITS-MS-3025) and a ferromagnetic plate (e.g., stainless steel) | Two separately controllable electromagnets determine the frictional force during mouse movement |
| Thermal conductivity | a Peltier element (TES1-127025) | The intensity and the sign of the applied voltage (warm or cold) on a Peltier |

-continued

| Tactile dimension | Actuator | Description |
|---|---|---|
| | | element simulate different effects of the thermal conductivity. |
| Hardness | a servo (AS0403) | As one implementation, the differential positioning of macroscopic roughness servo S1 and its stiffness can be used to simulate different levels of surface hardness. Another S3 servo is used to block the upper mouse body to simulate hard surfaces. |

A heat conduction network around a configured Peltier element P can be designed in order to allow the user to feel temperature changes over a wide area. The Peltier element P may be embedded in the upper side of the housing 10' of the mouse 1'. From there, rectangular grooves can be filled with a thermally conductive material to spread the sense of heat transfer over the whole hand.

It is not necessary to conduct heat over the entire hand surface since human sensation of temperature is of relatively coarse resolution. The grooves form a sieve with a thickness in the order of centimeters and have a width of 1 mm. The specific shape of the net is designed so that the heat can be quickly led in many directions. A silver conductive paint which completely fills the grooves can be used as a thermally conductive material.

For the simulation of the high-frequency microscopic roughness effects, a so-called voice coil actuator can be used, which is installed in the tactile computer mouse 1'. Alternatively, other microscopically rough display technologies may be used, e.g., electro-vibratory based touch panels, to represent the high frequency roughness effects.

In one scenario, such a modified touch panel may additionally be used as an underlying mouse pad as a pad 20. The various microscopic perceptions can be represented on the ball of the thumb using the same source of vibration data, e.g., determined from acceleration sensors, in the underside of the hand while the user B moves with the tactile computer mouse 1', as shown in FIG. 7.

FIG. 7 shows a combination of an electro-vibrating touch display and the tactile computer mouse 1' as input/output device 1.

The inventive approach can be extended with other tactile output technologies. In this case, the user B experiences the fine roughness impressions through the ball of the thumb and lower parts of the hand while moving the tactile computer mouse 1'.

Similar to a voice coil actuator VC, the touch panel can be driven by the sound card and an amplifier and also uses the same algorithms for the simulation of fine roughness. The fine roughness impressions in this approach only arise by electrostatic interactions between the touch panel and the human ball of the thumb.

Physical Model: Tactile Computer Mouse and Implementation

The following figures and equations show the abstract physical model of the mouse prototype.

FIG. 8 provides a general overview of the components of a input/output device 1 designed as a computer mouse 1' with a pad 20, having upper part 11 and lower part 12 of a housing 10'.

Microscopic Roughness

FIG. 9 illustrates a resulting vibration force $F_{tactile}$ that can be generated uniformly distributed by means of an actuator 30 with voice coil VC in the upper part 11 of a computer mouse 1' as part of an input/output device 1 according to the invention, thereby producing a three-dimensional high-frequency force vector $F_{tactile}$ in the upper part 11. The microscopic roughness force vector $F_{tactile}$ is proportional to the excitation current $I_{VC}$ in the voice coil, which is, for example, fed from an amplifier. This results in the following relationship (1):

$$|\vec{F}_{tactile}| \propto \frac{\mu_0 \cdot \mu_R^2 \cdot A \cdot N^2}{2 \cdot l^2} \cdot I_{VC}^2 \quad (1)$$

Friction

Friction can be represented on the input/output device 1 by the use of one or more controllable electromagnets EM1, EM2 as part of a (fourth) actuator 60.

FIG. 10 shows an embodiment of the body 10 of the input/output device 1 as a mouse 1' with two electromagnets EM1, EM2. These can exert different attractive normal forces FN1 and FN2, which are controlled via the supply current I. If they are also driven with different currents, a torque $M_{Y,ext}$ can be reproduced around the Y-axis, which can be considered as a magnetic torque.

The thereby adjustable magnetic attraction forces $F_{N1}$ and $F_{N2}$ as normal forces and the corresponding occurring friction forces $F_{R1}$ and $F_{R2}$ as lateral forces are given by the electric currents I flowing through the two electromagnets EM1, EM2 and are proportional to these.

The following relationships (2) to (5) apply:

$$\sum F_{R,1,2} \propto \frac{\mu_0 \cdot \mu_R^2 \cdot A \cdot N^2}{2 \cdot l^2} \cdot I^2 \quad (2)$$

$$\sum F_x = F_{ext} - (F_{R1} + F_{R2} + F_{Rm}) = 0 \quad (3)$$

$$\sum F_y = F_g - (F_{N1} + F_{N2} + F_{Nm}) = 0 \quad (4)$$

$$\sum M_Y = M_{Yext} - \mu \cdot (F_{N1} \cdot l_1 + F_{N2} \cdot l_2) = 0 \quad (5)$$

The relationships (3) to (5) describe forces or moment equilibria.

Macroscopic Roughness

The macroscopic roughness, which is descriptive of a type of contour of a surface, can be represented by a tilting of a first housing part 11 relative to a second housing part 12 of a housing 10' of the body 10. The body 10 may again be part of a computer mouse 1' or any other embodiment of the input/output device 1. This can be achieved, for example, via the use of a plurality of servomotors S1, S2 and their corresponding current feed, by which in each case a pivot axis of the upper part 11 of the housing 10' may be defined.

The change of the positions or placements of the servos S1, S2 leads to external torques $M_{X,ext}$ and $M_{Z,ext}$ which are used to represent surface height structures.

The following relationships (6) and (7) apply here in the moment equilibrium:

$$\Sigma M_X = M_{Xext} - M_{X,S2} = 0 \quad (6)$$

$$\Sigma M_Z = M_{Zext} - M_{X,S1} = 0 \quad (7)$$

FIG. 11 shows how the height profile information can be derived and converted from grayscale surface images. The positioning or placement of two connected servomotors S1, S2 is changed in accordance with this information to generate the torques $M_{X,S2}$ around the X-axis and $M_{Z,S1}$ around the Z-axis and to reach the corresponding position or placement.

Hardness

Different approaches can be chosen for the simulation of the hardness of a surface. In the following, three possible implementations of different hardness simulation concepts will be explained with reference to FIGS. 12 to 14 in the following.

(1) In the implementation 1 according to FIG. 12, the fact is utilized that the servomotor S1, which is also used to represent the feeling of macroscopic roughness, is not infinitely stiff.

In this case, different positions of the servo S1 can be used to convey a different perception of the hardness, since the user can press this not perfectly stiff servomotor S1 to different extent. In addition, the supply voltage of the servomotor S1 can be reduced to represent even softer spring constants. In other words, during use of the servomotor S1 to represent the surface contour structure during movement, different positions or placements of the servo S1 are simultaneously used to convey a different perception of the hardness. As already mentioned, softer impressions can be conveyed and represented by reducing the supply voltage of servomotor S1.

In contrast, an additional servomotor S3 can be used to convey and represent hard surfaces, such as metals or stones. This is arranged to block the pressing of the upper mouse body 11 due to the finite rigidity of the servomotor S1 for the simulation of macroscopic roughness.

As long as no motion is detected, the servo S1 which is used for macroscopic roughness can be brought to a rest position just above the blocking range of servo S3, thus representing hard objects.

(2) In the implementation 2 according to FIG. 13, the position or placement of the other servomotor S4 controls or regulates the ratio of the two lever arms l1 and l2 to change an effective spring constant of the spring 52. A bearing 51 provides stability when the spring 52 is not extended with the spring constant $k_{spring}$. When external pressure forces are exerted, the extent that the spring 52 can be extended depends on the position of the servomotor S4, which leads to a force and torque equation according to the expression (8).

$$\Sigma F_x = F_{ext} + k_{spring} \cdot \Delta x + F_N = 0 \tag{8}$$

This means in other words that the positioning or placement of the servomotor S4 determines the fulcrum 15 and thus different effective spring forces for the illustrated construction. This leads to different perceptions of the virtual surface hardness.

(3) As a third implementation, according to FIG. 14, a hardness manipulation system that uses a movable slider 53 in the manner of a toothed rack or cograil having a number of N springs 52 and having a bolt 55 is conceivable. Depending on the position of the servo S4, more or fewer springs 52 are located effectively under the upper part 11 of the body or housing 10' of the tactile computer mouse 1' as an embodiment of the input/output unit 1 according to the invention, thereby setting a controllably effective working spring constant $k_{stiff}$ according to the relationship (10).

$$k_{stiff} = \sum_{i=1}^{N} k_{spring i} \tag{10}$$

The maximum representable hardness that can be achieved by the system according to FIG. 14 when the bolt 55 is moved under the upper part 11 of the body or housing 10' of the tactile computer mouse as an embodiment of the input/output unit 1 and thus hard materials such as wood or stones can be represented.

FIG. 14 shows this further implementation utilizing a plurality of springs 52 that can be moved into and out of the tactile computer mouse 1' to achieve a controllable hardness property.

Thermal Conductivity

According to FIG. 15, a change in the supply voltage at the provided Peltier element P leads to different thermal energies, which are distributed by heat-conducting lines through the upper mouse body 11. Reversing the supply voltage, for example through the use of relays, makes it possible to change from hot to cold simulation of surface properties and vice versa.

The voltage signal applied to the Peltier element P and its sign determine according to the relationship (11) the intensity of the cooling or heating power and thus the perceived tactile dimension of the heat of the surface.

$$Q_c + U_{Pelt} \cdot P_{elt} - Q_h = 0 \tag{11}$$

Surface Simulation

The following section presents an embodiment for a procedural or algorithmic implementation of the surface simulation using an embodiment of the input/output unit 1, in particular using a tactile computer mouse 1'.

Control signals from raw data of a so-called surface database 140 are used to actuate the various actuators 30, 40, 50, 60, 70. Such raw data and the corresponding databases 140 can be generated by the experimental reading of surface properties of different materials, as in the context of the publications (I) "Haptic Texture Database" Strese, Schuwerk, Chaudhari and Steinbach, 2016, (www.lmt.ei.tum.de/texture/)

(II) "Surface Classification Using Acceleration Signals Recorded During Human Freehand Movement" Strese, Schuwerk, Steinbach, IEEE World Haptics Conference (WHC) 2015, is explained in detail In the following, the detection of all necessary signals as well as the modeling concept are presented, with which detected signals can be converted into a tactile simulation, in order to drive and apply an input/output unit 1 and in particular a tactile computer mouse 1' in a VE application.

Surface Material Database and Raw Data Signals

The present disclosure is based on recording with corresponding sensors acceleration, frictional force, reflection and sound signals as well as surface images of surfaces of different materials, especially with the aid of a hand-held sensor.

The surfaces used can be formed from a wide variety of everyday materials, wherein each surface is associated a unique name. A tactile database is generated in this way.

The tactile database 140 can be used, for example, as a data source for actuating the input/output unit 1. It provides the raw signals that can be used to identify either the relevant tactile properties of a surface material or to virtually represent surfaces.

The necessary signals for the realistic simulation arise, for example, from the acceleration data.

The necessary sensors may include acceleration sensors, microphones, infrared reflection sensors, force sensitive resistors, and optical sensors, and in particular cameras. These sensors provide the raw signals that represent, for example, a stone tile during the sensor-based freehand recording. In view of the proposed application of the surface simulation, a local copy of this tactile database is present on a PC on which the surface simulation application is running. If the user would like to explore another interface during the application, the raw data that represents the surface can be retrieved from the tactile database.

Signals recorded in this way from a tactile database are used, if appropriate after adaptation to the five dimensions of the surface simulation according to Okamoto et al.

Simulation of Microscopic Roughness—Vibroacoustic Data

Acceleration and sound signals which arise from the interaction between the tool and surface can be combined into a single so-called vibroacoustic signal.

To generate e.g. stone tile data, acceleration, audio, reflection and friction force signals as well as images which are recorded with corresponding sensors can be used. In this case, signals can be recorded, for example, when striking the surface and/or during the sweeping of the surface, in order to create a corresponding model for a respective surface and/or to classify a respective surface. Each signal may or will be intended for further processing of the surface simulation.

Typically, recorded acceleration signals cover a frequency range of about 10 Hz to about 600 Hz and audio data covers a bandwidth of 10 Hz to 20 kHz.

If appropriate, both spectra of an acceleration signal and of a sound signal are combined to a material or a surface, wherein, for example, the spectral sound information in the spectral range of the acceleration signals, i.e., between 10 Hz to 600 Hz, may not be taken into account.

It should be noted that the signals may be recorded under controlled conditions, e.g., under known sampling power and speed, and/or using a robotic-controlled recording setup to obtain normalized signals.

While exploring an unknown surface, a human probes, on average, at a speed of 130 mm/s, while applying a pressing force of about 1 N. In addition, changes in the pressing force have only a small influence on the perceived surface roughness.

As a valid simplification, the surface simulation application according to the invention uses normalized signals and transforms them to the extent that the user quickly moves the tactile input/output unit 1 according to the invention, and in particular the computer mouse, over a surface.

For the approach presented here, three second long acceleration and sound signals are sufficient to restore the dimension of microscopic roughness. When the tactile input/output unit 1 and in particular the tactile computer mouse 1' is moved, these signals are displayed via the actuators with an infinite loop until the user B stops the mouse movement.

Simulation of Hardness, Friction, Thermal Conductivity—Tabular Data

Since the tactile surface simulation application according to the invention uses locally stored surface models using a tactile input/output unit 1, and more particularly a tactile computer mouse 1', tabular values for surface-related static properties may be used. For example, the hardness or stiffness of a surface is correlated with its known modulus of elasticity or its spring stiffness. The static friction coefficient can be taken from known values and used. When no tabular values are given for certain surface materials, values of tactilely similar surface materials may be used for stiffness, dynamic friction, and thermal conductivity coefficients.

Simulation of Macroscopic Roughness—Grayscale Images of Surface Materials

In addition to the tactile-related signals, visual information can also be displayed on a screen for a realistic surface simulation and used as a basis.

Since surface material images may also contain surface profile and/or elevation map information, grayscale images may be post-processed with contour filters and/or extracted from the display images to represent a or the tactile dimension of macroscopic roughness. Display images and the associated elevation map images can be correlated. It should be noted that other technologies, such as infrared sensors, may be used during the controlled sweeping of a surface over a surface material to measure the shape of the surface profile.

Surface Material Model

The five perceptible tactile dimensions of Okamoto are used to define a set of input values for a computer program. Three scalar values can be defined in this case, which describe the hardness, the friction coefficients and the thermal conductivity of a surface material.

In addition, the shape of the macroscopic roughness elevation map images may define another scalar value.

Finally, the signal power of the normalized acceleration signal may define a scalar value which leads to a parameter set with five tactile values that represent a surface material.

In addition, the acceleration signal and/or the sound signal, for example, three seconds each and possibly display and elevation map images can be made available to generate and represent a virtual surface material.

System Overview and Software Implementation

This section describes how the tactile input/output unit 1, presented above, for example in form of a tactile computer mouse 1', can be used in the context of the surface simulation with the surface material model that can be used.

FIG. 17 provides a general overview of one embodiment of the surface simulation application according to the invention.

This application allows the user B to switch between different surfaces in a virtual environment using the keyboard. When the tactile computer mouse 1' is moved, the underlying surface model and the changes in the X and Y direction of the mouse position 113 are used to generate all necessary signals for a tactile surface simulation.

According to FIG. 17, the application may query a surface from the tactile database 140 and make visible a visual simulation on a screen 110, 111. When changes in the mouse position 113 are registered, vibroacoustic data, for example in form of acceleration and/or audio data, may be sent to an amplifier, which then drives the voice coil VC or the voice coil actuator or a speaker 112 for display.

In parallel, for this purpose, control signals may be sent to an audio device to control the positioning of servos S1 to S3 as well as the intensities of the energization of electromagnets EM1, EM2 and/or a Peltier element P. Both the electromagnets EM1, EM2 and the Peltier element P are driven by amplifier circuits.

FIG. 18 shows in detail how models of the surfaces for generating the control signals for the connected actuators 30, 40, 50, 60, 70 of the tactile input/output unit 1 and in particular of the tactile computer mouse 1' can be converted.

For a desired surface, a database search is performed to retrieve, for example, the spring constant, the static/dynamic friction coefficient and/or thermal conductivity which are mapped to corresponding control signals. For the friction coefficients, the current mouse speed is required to determine the transition between static and dynamic friction. The hardness of a surface is determined both by the displacement of the servo S1 and by the servo S3, which can block the movement of the upper part 11 of the input/output unit 1 and in particular the upper mouse body 11, when a stiff/hard object having a force greater than 700 N/m is to be represented.

In addition, the vibroacoustic signal is adjusted according to the current intensity and the amplitude is scaled based on the acceleration signal energy. The speed can be estimated by evaluating a number of n old or a last taken positions. The current X and/or Y position of the input/output unit 1, for example, the tactile computer mouse 1', is used on the screen 110, 111 to index the corresponding pixel in the contour image and/or in the height map. The gradients to the neighboring pixels are calculated in this gray scale image to obtain an x/y gradient as an input for both servos S1, S2 for the macroscopic roughness.

Overall, the concept proposed in this specification offers an input/output device 1 for the display of tactile information for a user B. It can be intuitively integrated into current applications in order to enrich the perceived user experience.

LIST OF REFERENCE NUMBERS 1 (tactile) input/output device/unit
1' (tactile) computer mouse
10 body
10' housing
11 first part, upper part
12 second part, lower part
12-1 housing part
12-2 housing part
13 switch
14 center of gravity
15 pivot point
20 base
20a surface, top side
21 upper layer, film
22 interaction layer, ferromagnetic layer
23 base
30 (first) actuator, actuator, voice coil assembly (for microscopic roughness)
40 (second) actuator, actuator, (first) servo arrangement (for macroscopic roughness)
50 (third) actuator, actuator, (second) servo arrangement (for hardness)
51 support element, bearing
52 spring
53 cograil, toothed rack
54 gear wheel
55 support, bolts
60 (fourth) actuator, actuator, magnet assembly (for friction)
70 (fifth) actuator, actuator, Peltier arrangement (for heat)
100 data processing system
110 display unit
111 optical/optical-visual display
112 acoustic display
113 pointer
114 data area, display area
115 detection and/or control channel, communication channel
116 detection and/or control channel, communication channel
120 processing unit
130 central processing unit
140 database unit, database
B user
EM1 electromagnet
EM2 electromagnet
l1 lever
l2 lever
P Peltier element
S1 (first) servomotor, servo
S2 (second) servomotor, servo
S3 (third) servomotor, servo
S4 (fourth) servomotor, servo
VC voice coil
X spatial direction
Y spatial direction
Z spatial direction

What is claimed is:

1. An input/output device for a data processing system, comprising:
   a housing; and
   a plurality of actuators in operative connection with the housing,
   wherein the actuators are arranged within the housing and configured to effect in a user through the housing a tactile perception of at least two dimensions selected from the group consisting of microscopic roughness, macroscopic roughness, friction, hardness, and thermal conductivity, and
   wherein the plurality of actuators comprises a second actuator which is arranged in the housing to generate tactilely perceivable tilting movements of a first part of the housing relative to a second part of the housing around one or more tilt axes to simulate macroscopic roughness of a surface.

2. The input/output device as in claim 1, wherein the plurality of
   actuators comprises at least two actuators selected from the group consisting of
   an actuator configured to adjust a position of the housing,
   an actuator configured to adjust an orientation of the housing,
   an actuator configured to adjust a movement of the housing,
   an actuator configured to adjust a vibration of the housing,
   an actuator configured to adjust a mobility of the housing,
   an actuator configured to adjust a heat transfer through the housing, and
   an actuator configured to adjust a displaceability of the input/output device relative to a pad.

3. The input/output device as in claim 1, wherein a first actuator from the plurality of actuators is arranged in the housing to generate a tactilely perceivable vibration to simulate microscopic roughness of a surface.

4. The input/output device as in claim 3, wherein the first actuator comprises a voice coil assembly having at least one voice coil and vibration mass, wherein the vibration mass can be excited to vibrate by application of an electrical voltage to the voice coil.

5. The input/output device as in claim 1, wherein the second actuator comprises a servomotor which tiltably mechanically couples to each other the first part of the housing and the second part of the housing.

6. The input/output device as in claim 1, wherein a third actuator from the plurality of actuators is arranged in the housing to generate a tactilely perceivable mobility of a first part of the housing relative to a second part of the housing around one or more tilt axes to simulate hardness of a surface.

7. The input/output device as in claim 1, wherein a fourth actuator from the plurality of actuators is arranged in the housing to adjust a displaceability of the input/output device relative to a pad to simulate friction of a surface.

8. An input/output device for a data processing system, comprising:
a housing; and
a plurality of actuators in operative connection with the housing,
wherein the actuators are arranged within the housing and configured to effect in a user through the housing a tactile perception of at least two dimensions selected from the group consisting of microscopic roughness, macroscopic roughness, friction, hardness, and thermal conductivity, and
wherein the plurality of actuators comprises a fourth actuator which is arranged in the housing to adjust a displaceability of the input/output device relative to a pad to simulate friction of a surface.

9. The input/output device as in claim 1, wherein a fifth actuator from the plurality of actuators is arranged in the housing to adjust a heat transfer through a body of the input/output device to simulate thermal conductivity of a surface.

10. An operating method for a manually operable tactile input/output device for a data processing system as in claim 1, comprising:
controlling the plurality of actuators to effect a tactile perception by the user when in manual contact with the housing, the tactile perception including at least two tactile perception dimensions selected from the group consisting of microscopic roughness, macroscopic roughness, friction, hardness, and thermal conductivity.

11. The operating method as in claim 10, wherein controlling the plurality of actuators is based on
one or more datasets which reflect an association between materials and parameters which are representative of one or more tactile perception dimensions selected from the group consisting of microscopic roughness, macroscopic roughness, friction, hardness, and thermal conductivity of the respective materials.

12. The operating method as in claim 10, further comprising:
controlling a visual-optical and/or acoustic output, which represent further properties of materials simultaneously with the control of the actuators.

13. A data processing system, configured to execute the operating method according as in claim 10.

14. The data processing system as in claim 13, comprising a database for storing one or more data records which reflect an association between materials and parameters which are representative of one or more of tactile perception dimensions selected from the group consisting of microscopic roughness, macroscopic roughness, friction, hardness, and thermal conductivity of the respective materials.

15. An input/output device for a data processing system, comprising:
a housing; and
a plurality of actuators in operative connection with the housing,
wherein the actuators are arranged within the housing and configured to effect in a user through the housing a tactile perception of at least two dimensions selected from the group consisting of microscopic roughness, macroscopic roughness, friction, hardness, and thermal conductivity, and
wherein the plurality of actuators comprises a third actuator which is arranged in the housing to generate a tactilely perceivable mobility of a first part of the housing relative to a second part of the housing around one or more tilt axes to simulate hardness of a surface.

16. The input/output device as in claim 15, wherein the third actuator comprises a servomotor which counteracts a manual operation by the user.

17. The input/output device as in claim 8, wherein the fourth actuator comprises an electromagnet which interacts with a ferromagnetic layer of the pad.

18. An input/output device for a data processing system, comprising:
a housing; and
a plurality of actuators in operative connection with the housing,
wherein the actuators are arranged within the housing and configured to effect in a user through the housing a tactile perception of at least two dimensions selected from the group consisting of microscopic roughness, macroscopic roughness, friction, hardness, and thermal conductivity, and
wherein the plurality of actuators comprises a fifth actuator which is arranged in the housing to adjust a heat transfer through a body of the input/output device to simulate thermal conductivity of a surface.

19. The input/output device as in claim 18, wherein the fifth actuator comprises a Peltier element.

* * * * *